US012085426B2

(12) United States Patent
Knieper et al.

(10) Patent No.: US 12,085,426 B2
(45) Date of Patent: Sep. 10, 2024

(54) FLIP-OUT RAMP FOR VEHICLE

(71) Applicant: Hübner Transportation GmbH, Kassel (DE)

(72) Inventors: Karl Knieper, Kassel (DE); Daniel Blümer, Melsungen (DE); Detlef Gutkuhn, Espenau (DE); Rolf Herwig, Lohfelden (DE)

(73) Assignee: HÜBNER TRANSPORTATION GMBH, Kassel (DE)

( * ) Notice: Subject to any disclaimer, the term of this patent is extended or adjusted under 35 U.S.C. 154(b) by 632 days.

(21) Appl. No.: 17/336,459

(22) Filed: Jun. 2, 2021

(65) Prior Publication Data

US 2022/0388437 A1     Dec. 8, 2022

(51) Int. Cl.
| | | |
|---|---|---|
| *G01D 9/00* | (2006.01) | |
| *A61G 3/06* | (2006.01) | |
| *B60P 1/43* | (2006.01) | |
| *G06F 1/3206* | (2019.01) | |
| *G06F 1/3287* | (2019.01) | |
| *G06F 1/3293* | (2019.01) | |
| *G06F 13/16* | (2006.01) | |

(52) U.S. Cl.
CPC .............. *G01D 9/00* (2013.01); *A61G 3/061* (2013.01); *B60P 1/433* (2013.01); *G06F 1/3206* (2013.01); *G06F 1/3287* (2013.01); *G06F 1/3293* (2013.01); *G06F 13/1689* (2013.01); *Y02D 10/00* (2018.01); *Y02D 30/50* (2020.08)

(58) Field of Classification Search
CPC ........ A61G 3/061; G01D 9/00; G06F 1/3206; G06F 1/3287; G06F 1/3293; G06F 13/1689; B60P 1/433; Y02D 10/00; Y02D 30/50

USPC .................................................. 14/69.5–72.5
See application file for complete search history.

(56) References Cited

U.S. PATENT DOCUMENTS

| | | | | |
|---|---|---|---|---|
| 5,253,410 A | * | 10/1993 | Mortenson | .............. B60P 1/431 14/71.1 |
| 6,602,041 B2 | | 8/2003 | Lewis et al. | |
| 6,843,635 B2 | * | 1/2005 | Cohn | ...................... B60P 1/433 414/921 |
| 7,681,272 B2 | | 3/2010 | Morris et al. | |

(Continued)

FOREIGN PATENT DOCUMENTS

| | | | | |
|---|---|---|---|---|
| CA | 2630373 A1 | | 11/2009 | |
| FR | 3045318 A1 | * | 6/2017 | ............. A61G 3/067 |

(Continued)

*Primary Examiner* — Raymond W Addie
(74) *Attorney, Agent, or Firm* — Dinsmore & Shohl LLP

(57) ABSTRACT

A ramp assembly is provided comprising a ramp that is pivotally movable between a fold-in position and a fold-out position through a neutral position, a drive shaft spaced from an axis of pivot of the ramp in a direction perpendicular to the axis, a drive element transmitting rotational force from the drive shaft to the ramp such that rotation of the drive shaft causes movement of the ramp between the fold-in and fold-out positions, and a spring generating a biasing force by being rotationally tensioned, the spring biasing the drive shaft such that the ramp is biased toward the neutral position when the ramp is in the fold-out position and biased toward the neutral position when the ramp is in the fold-in position. A vehicle incorporating such ramp assembly is also contemplated.

20 Claims, 23 Drawing Sheets

(56) References Cited

U.S. PATENT DOCUMENTS

| | | | |
|---|---|---|---|
| 7,908,695 B2* | 3/2011 | Budd | A61G 3/061 |
| | | | 14/71.3 |
| 7,913,341 B1 | 3/2011 | Morris et al. | |
| 7,913,342 B1 | 3/2011 | Morris et al. | |
| 7,913,343 B1* | 3/2011 | Cohn | B60P 1/433 |
| | | | 14/71.3 |
| 8,020,234 B2 | 9/2011 | Johnson et al. | |
| 8,166,594 B1 | 5/2012 | Morris | |
| 8,327,485 B1 | 12/2012 | Morris et al. | |
| 8,631,529 B1* | 1/2014 | Johnson | B66B 9/0869 |
| | | | 14/71.3 |
| 8,739,341 B1 | 6/2014 | Morris | |
| 8,782,840 B2 | 7/2014 | Saucier et al. | |
| 8,869,333 B2* | 10/2014 | Johnson | B60P 1/433 |
| | | | 14/71.3 |
| 9,125,778 B2 | 9/2015 | Fisher et al. | |
| 10,568,786 B1* | 2/2020 | Nunn | A61G 3/061 |
| 2003/0210976 A1* | 11/2003 | Koretsky | A61G 3/061 |
| | | | 14/71.1 |
| 2008/0273956 A1* | 11/2008 | Morris | B60P 1/433 |
| | | | 414/540 |

FOREIGN PATENT DOCUMENTS

| | | |
|---|---|---|
| WO | 04062544 A2 | 7/2004 |
| WO | 09134975 A1 | 11/2009 |

* cited by examiner

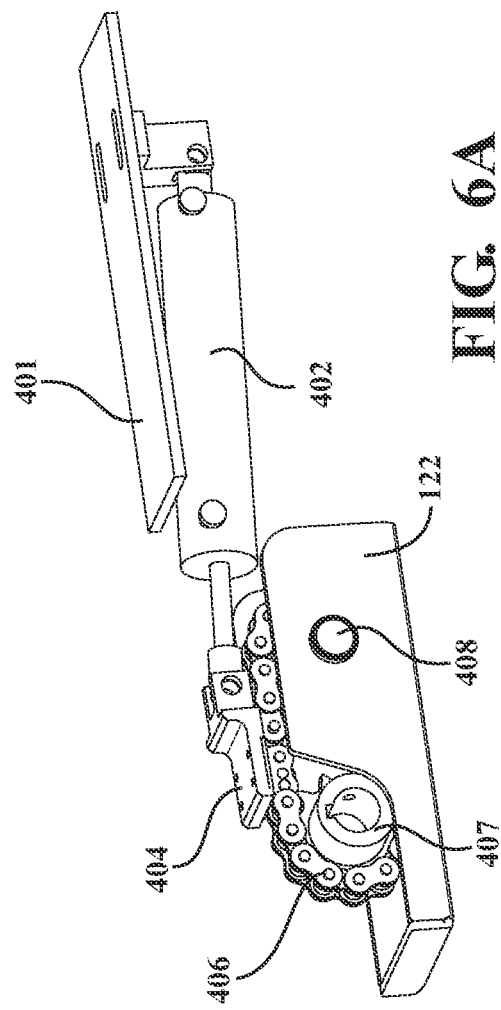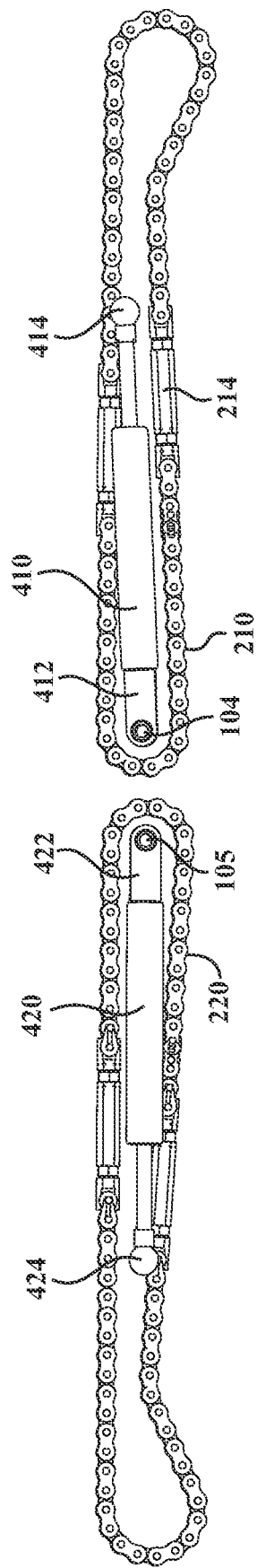
FIG. 6A
FIG. 6B

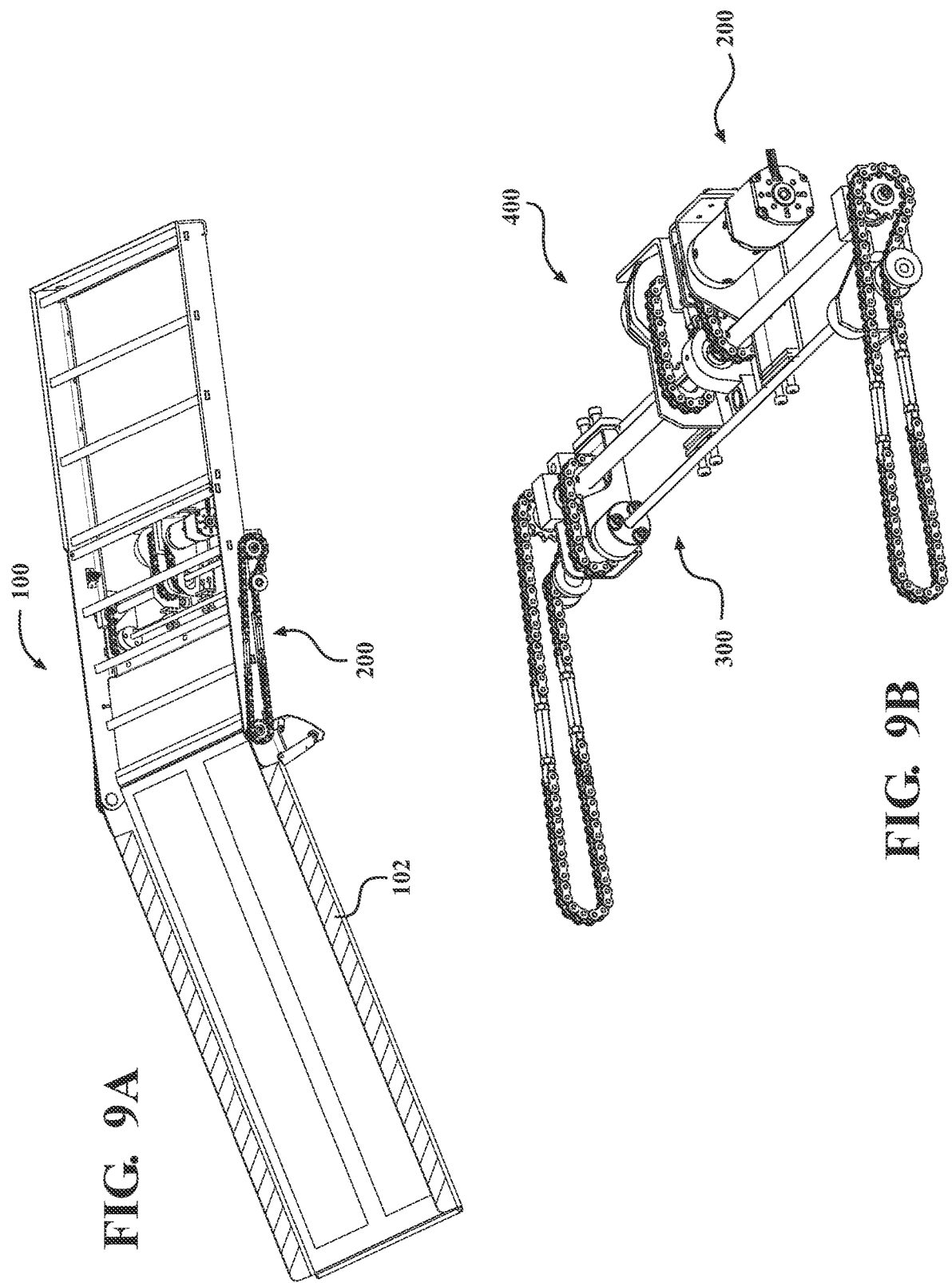

FLIP-OUT RAMP FOR VEHICLE

BACKGROUND

Field

The present disclosure relates to a foldable ramp assembly with a restraint for supporting an operation of the ramp.

Technical Background

Various ramp assemblies are designed to provide a connected route or path from one surface to another surface. For example, a foldable ramp may be used as an access to a vehicle or a building from a sidewalk. A foldable ramp generally pivots at one end and flips over from a fold-in position to a fold-out position. For example, a foldable ramp for a vehicle is stowed in a vehicle floor and folds out when being used as a ramp and creates a slope between a sidewalk and the vehicle floor. The ramp is usually coplanar with the vehicle floor when the ramp is in the fold-in position. A ramp assembly generally operates using a drive mechanism, such as a motor, to move the ramp between the fold-in and fold-out positions. The operation of the ramp may require assistance for reducing the load on the motor. Additionally, manual operation is useful when the drive mechanism is not in action. For instance, in the case that a vehicle loses power, it may be advantageous to be able to manually operate the ramp to, for example, evacuate a wheelchair driver. However, the manual operation is often difficult because of the resistance from the drive mechanism or the weight of the ramp. Accordingly, a ramp assembly may require an assistance for manually moving the ramp.

SUMMARY

A ramp assembly with a foldable ramp may comprise a restraint that provides support for a manual operation of a ramp. A foldable ramp generally pivots at one end and flips over from a fold-in position to a fold-out position through a neutral position using a drive mechanism, such as a motor. When manual operation of a ramp is desirable, a restraint may assist lifting the ramp up. While a restraint may be operatively coupled to various components of the ramp assembly for assisting the ramp operation, an existing configuration of a restraint biases a ramp pivot by being operatively coupled to the ramp pivot. Such configuration may reduce accessibility to the restraint for maintenance purposes. Accordingly, there is an ongoing need for arranging the restraint in a manner that does not reduce accessibility for maintenance. The present disclosure is directed to a ramp assembly with a restraint that is operatively coupled to a drive shaft. More specifically, the present disclosure may arrange a restraint to provide a bias to a drive shaft.

According to one or more aspects of the present disclosure, a ramp assembly may comprise a ramp that is movable between a fold-in position and a fold-out position through a neutral position, a ramp pivot pivotally supporting the ramp for movement about a pivot axis between the fold-in and fold-out positions, a drive shaft spaced from the ramp pivot in a direction perpendicular to the pivot axis, a drive element connecting the drive shaft to the ramp pivot such that rotation of the drive shaft causes rotation of the ramp pivot, and a spring generating a biasing force by being rotationally tensioned, the spring biasing the drive shaft such that the ramp is biased toward the neutral position when the ramp is in the fold-out position and biased toward the neutral position when the ramp is in the fold-in position.

According to one or more aspects of the present disclosure, a ramp assembly may comprise a ramp that is pivotally movable between a fold-in position and a fold-out position through a neutral position, a drive shaft spaced from an axis of pivot of the ramp in a direction perpendicular to the axis, a drive element transmitting rotational force from the drive shaft to the ramp such that rotation of the drive shaft causes movement of the ramp between the fold-in and fold-out positions, and a spring generating a biasing force by being rotationally tensioned, the spring biasing the drive shaft such that the ramp is biased toward the neutral position when the ramp is in the fold-out position and biased toward the neutral position when the ramp is in the fold-in position.

According to one or more aspects of the present disclosure, a vehicle having a ramp assembly may comprise a ramp that is movable between a fold-in position and a fold-out position through a neutral position, a ramp pivot pivotally supporting the ramp for movement about a pivot axis between the fold-in and fold-out positions, a drive shaft spaced from the ramp pivot in a direction perpendicular to the pivot axis, a drive element connecting the drive shaft to the ramp pivot such that rotation of the drive shaft causes rotation of the ramp pivot, and a spring generating a biasing force by being rotationally tensioned, the spring biasing the drive shaft such that the ramp is biased toward the neutral position when the ramp is in the fold-out position and biased toward the neutral position when the ramp is in the fold-in position.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 6A schematically depicts a damper assembly with a damper, according to one or more embodiments shown and described in this disclosure;

FIG. 6B schematically depicts a damper assembly with a pair of dampers coupled to drive elements, according to one or more embodiments shown and described in this disclosure;

FIGS. 9A-9D schematically depict the damper assembly of FIG. 6D coupled to a drive assembly, according to one or more embodiments shown and described in this disclosure;

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Figure 1A:
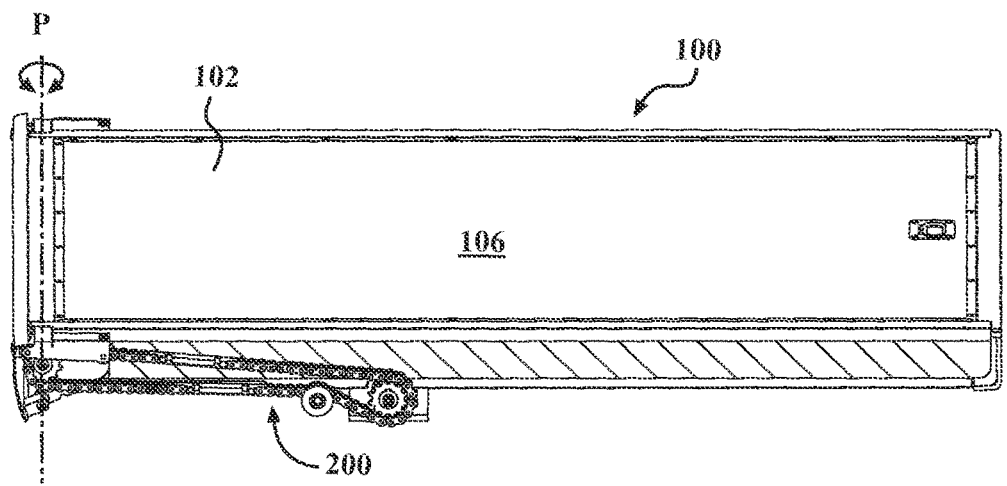
FIG. 1A schematically depicts a ramp assembly wherein a ramp is in a fold-in position, according to one or more embodiments shown and described in this disclosure.
Figure 1B:
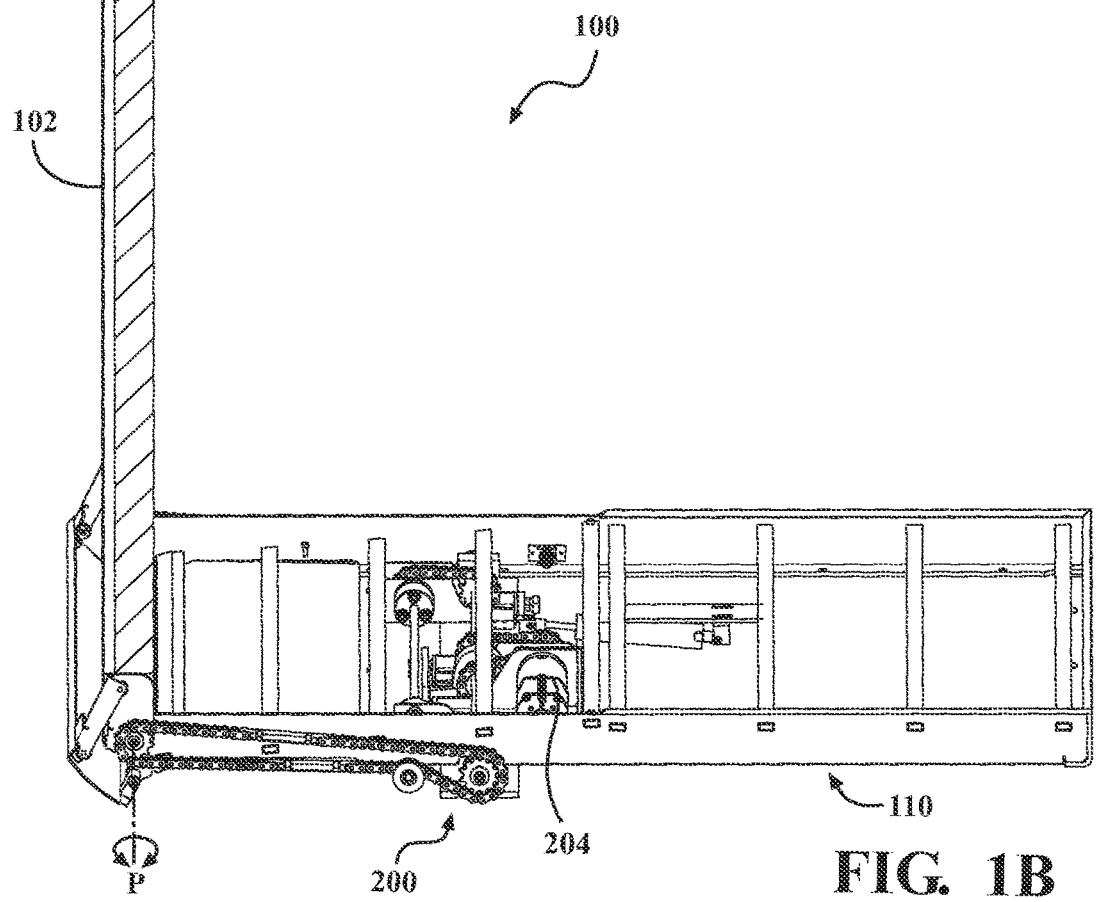
FIG. 1B schematically depicts the ramp assembly wherein the ramp is in a neutral position, according to one or more embodiments shown and described in this disclosure.
Figure 1C:
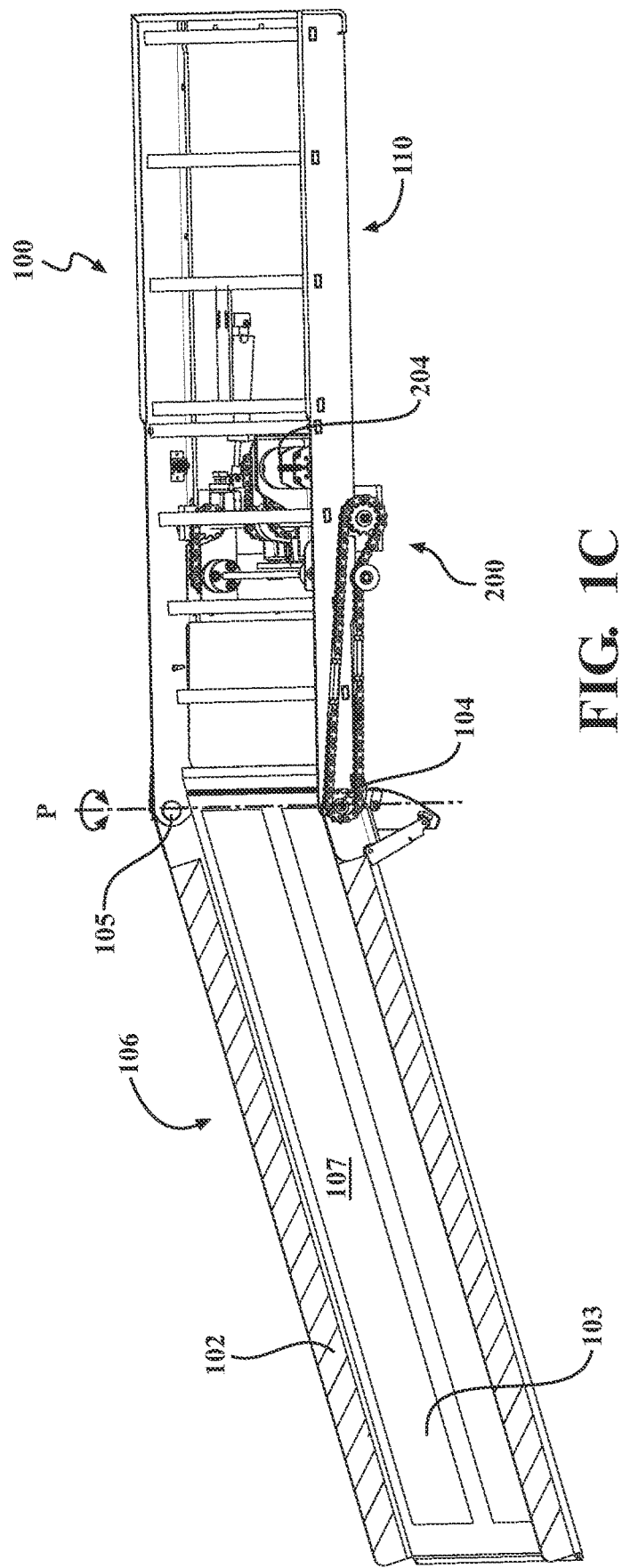
FIG. 1C schematically depicts the ramp assembly wherein the ramp is in a fold-out position, according to one or more embodiments shown and described in this disclosure.

The present disclosure is directed to a ramp assembly with a restraint for supporting an operation of the ramp. In particular, the ramp assembly of the present disclosure may include a ramp, a ramp pivot, a drive shaft, a drive element, and a restraint. Referring to FIGS. 1A, 1B, and 1C, one embodiment of a ramp assembly is schematically depicted. The ramp assembly may include a ramp, a ramp pivot, a drive shaft, a drive element, and a restraint. The ramp may be movable between a fold-in position and a fold-out position through a neutral position. The ramp pivot may pivotally support the ramp for movement between the fold-in and fold-out positions. The drive shaft may be spaced from the ramp pivot. The drive element may connect the drive shaft to the ramp pivot such that rotation of the drive shaft causes rotation of the ramp pivot. The restraint may rotationally bias the drive shaft such that the ramp is biased toward the neutral position when the ramp is in the fold-out position and biased toward the neutral position when the ramp is in the fold-in position. The ramp assembly may have any of the features as described in the preceding paragraph.

The various embodiments of the present disclosure for a ramp assembly may provide assistance for an operation of the ramp assembly. That is, the various embodiments of the present disclosure for a ramp assembly may lessen the power required for the operation of the ramp assembly.

Referring to FIGS. 1A, 1B, and 1C, a ramp assembly 100 may include a ramp 102, a frame 110, a ramp pivot 104 that may connect the ramp 102 and the frame 110 pivotally at one end of the frame 110, and a drive assembly 200 that may transmit power from a motor 204 to the ramp pivot 104 to move the ramp 102. The ramp 102 may rotate around a pivot axis P defined by the ramp pivot 104 and a ramp pivot 105. The ramp assembly 100 may be installed on a surface for smooth connection to another surface. The surface may be, for example, a floor of a vehicle or a building, or any other surface that requires a smooth connection to another surface. The frame 110 may be fixed to the surface, while the ramp 102 moves relatively to the surface. The frame 110 may operatively support the drive assembly 200.

Referring to FIG. 1A, the ramp 102 is in a fold-in position when the ramp 102 is not in use. The ramp 102 may be stowed in a space in a surface where the ramp assembly 100 is installed. The ramp 102 may be stowed such that the back side 106 of the ramp 102 is coplanar with the surface so that the surface may be flat.

Referring to FIG. 1B, the ramp 102 may be in a neutral position when the ramp 102 stands substantially vertical with respect to the surface. The ramp 102 passes through the neutral position when the ramp 102 is moved from the fold-in position to a fold-out position. The neutral position may be a position in which the ramp 102 maintains its position when there is no power transmitted from the drive assembly 200.

Referring to FIG. 1C, the ramp 102 is in the fold-out position when the ramp 102 is in use. The top surface 107 of the ramp 102 becomes a ramp surface on which, for example, wheelchairs may roll or people may walk. The angle of the ramp slope depends on the relative height differences between the surface defined above the frame 110 and the other surface to which the ramp 102 connects. The top surface 107 of the ramp 102 may have a non-slip element 103, such as non-slip tape or paint for safety. While the frame 110 is shown as open, a covering may be provided to define a surface for walking or rolling to and from the top surface 107.

Figure 2A:
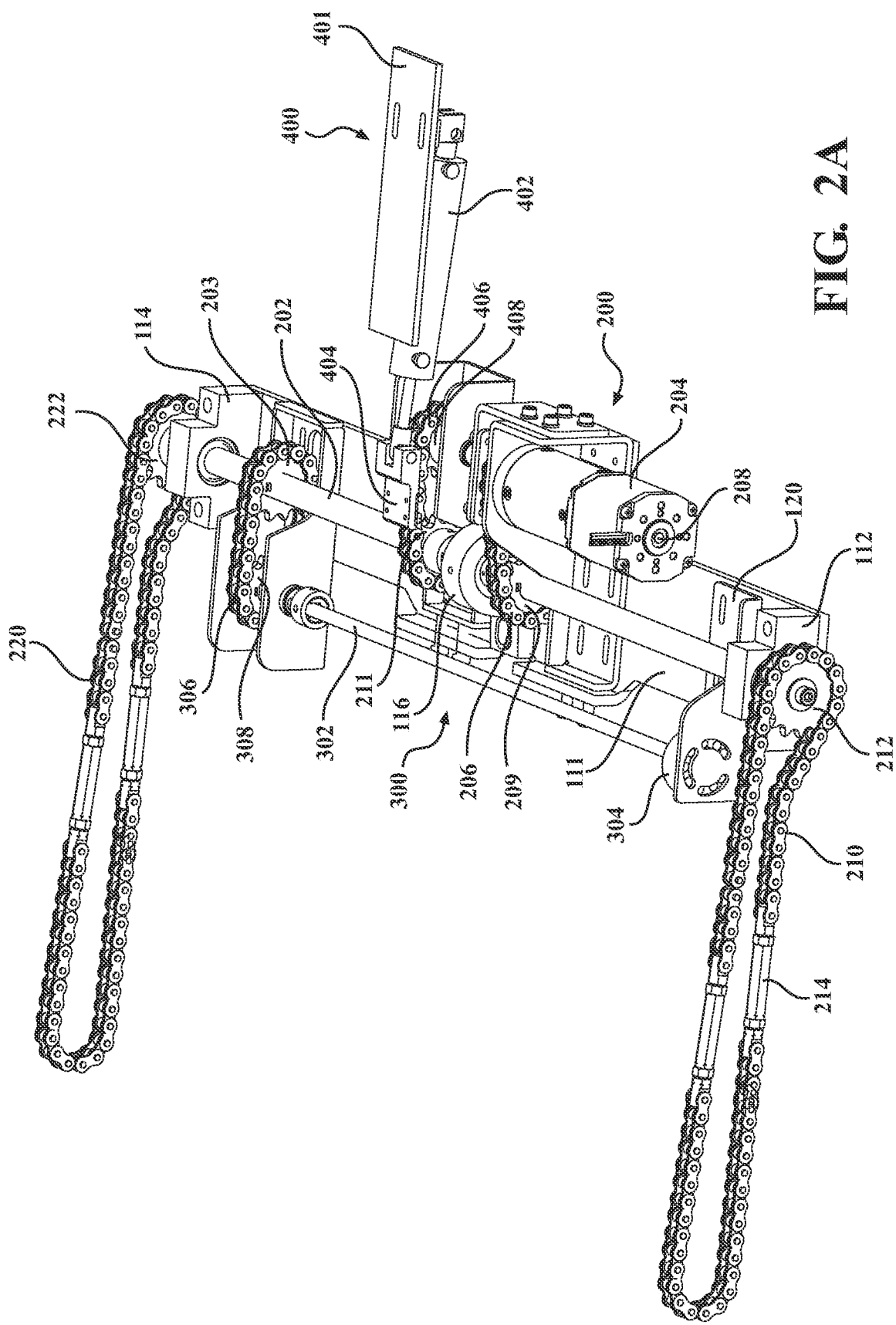
FIG. 2A schematically depicts a restraint assembly comprising a torsion bar and associated components of the ramp assembly, according to one or more embodiments shown and described in this disclosure.

Referring to FIG. 2A, one embodiment of the ramp assembly 100 may include the drive assembly 200, a restraint assembly 300, and a damper assembly 400. The drive assembly 200 may include a drive shaft 202, the motor 204, and a drive element 210. The drive shaft 202 is rotatably supported by a main bearing support 116 and a side bearing support 112 that are fixedly mounted to the frame 110. The motor 204 is operatively connected to the drive shaft 202 via a motor chain 206 such that the driving force from the motor 204 is transmitted to the drive shaft 202. The motor chain 206 is operatively supported by a gear on a motor shaft 208 and a gear 209 on the drive shaft 202. The drive shaft 202 further transmits the driving force to the drive element 210 through a side gear 212. The drive element 210 is operatively coupled to the ramp pivot 104 via a ramp gear 106 (the ramp pivot 104 and the ramp gear are shown in FIGS. 1A-1C). The drive element 210 may be a chain or a chain connected with a tensioner 214 to provide a constant amount of tension to the chain. The drive element 210 may be disposed at one end of the drive shaft 202 and exterior to the frame 110. Additional drive element 220 may be disposed at the other end of the drive shaft 202 in a similar manner as the drive element 210. The drive element 220 is operatively coupled to the ramp pivot 105 via a ramp gear (not shown but corresponding to the pivot 105). An alternative embodiment of the ramp assembly 100 may include one of the drive element 210 or the drive element 220. As will be clear to those of skill in the art, the motor 204 and the drive shaft 202 may be coupled in other ways, such as intermeshing gears, a belt, or any other way to mechanically couple the elements.

The restraint assembly 300 may include a torsion bar 302 as a restraint, and a restraint chain 306 that interconnects the torsion bar 302 and the drive shaft 202. The restraint chain 306 is operatively supported by a restraint gear 308 and a gear 203 on the drive shaft 202 at one end of the torsion bar 302. The torsion bar 302 is always engaged with the drive shaft 202. As used herein, "always engaged" means that rotation of the drive shaft in either direction and from any position causes twisting, or rotational tensioning, of the torsion bar 302. The torsion bar 302 is not mechanically isolated from or disengaged from the movement of the drive shaft 202 at any time. The other end of the torsion bar 302 is fixedly supported by a fixation assembly 304 that is fixed to a restraint plate 120. The restraint plate 120 is further fixed to the base plate 111 of the frame 110.

The torsion bar 302 is in a neutral state in which the torsion bar 302 is not twisted when the ramp 102 is in the neutral position. When the ramp 102 rotates to the fold-in position, the torsion bar 302 is twisted in the same direction of the rotation of the ramp 102 and generates a moment that acts toward the neutral state. As a result, the ramp 102 in the fold-in position receives the moment that rotates the ramp 102 toward the neutral position. Conversely, when the ramp 102 rotates to the fold-out position, the torsion bar 302 is twisted, or rotationally tensioned, in the same direction of the rotation of the ramp 102 and generates a moment that acts toward the neutral state. As a result, the ramp 102 in the fold-out position receives the moment that rotates the ramp 102 toward the neutral position. Therefore, the moment from the torsion bar 302 may reduce the load on the drive assembly 200. Additionally, when the drive assembly is not in use or there is a power failure, the resistant from the drive assembly or other components may add resistance to the movement of the ramp 102. Manually moving the ramp 102, therefore, requires some assistance or support mechanism. The restraint assembly 300 may act as a support mechanism that provides a moment to reduce the resistance from the drive assembly or other components and may make the operation of the ramp 102 easier than without the restraint assembly 300. In another embodiment, the torsion bar 302 may be inserted into a hollow space in the drive shaft 202 (not shown) to generate the moment that acts toward the neutral state.

The damper assembly 400 may include a damper 402 (e.g., hydraulic damper), a damper plate 401 that is fixedly supported by the frame 110, and a damper coupler 404 that couples the damper 402 to a damper chain 406. The damper chain 406 is operatively supported by a damper gear 408 and a gear 211 on the drive shaft 202. The damper assembly 400 may dampen the movement of the ramp 102 when the ramp 102 is moving through the neutral position and between the fold-in position and the fold-out position, so that the ramp 102 moves more smoothly, which may prevent the ramp from experiencing force or torque peaks and/or may prevent injuries to a user or an operator of the ramp.

Figure 2B:
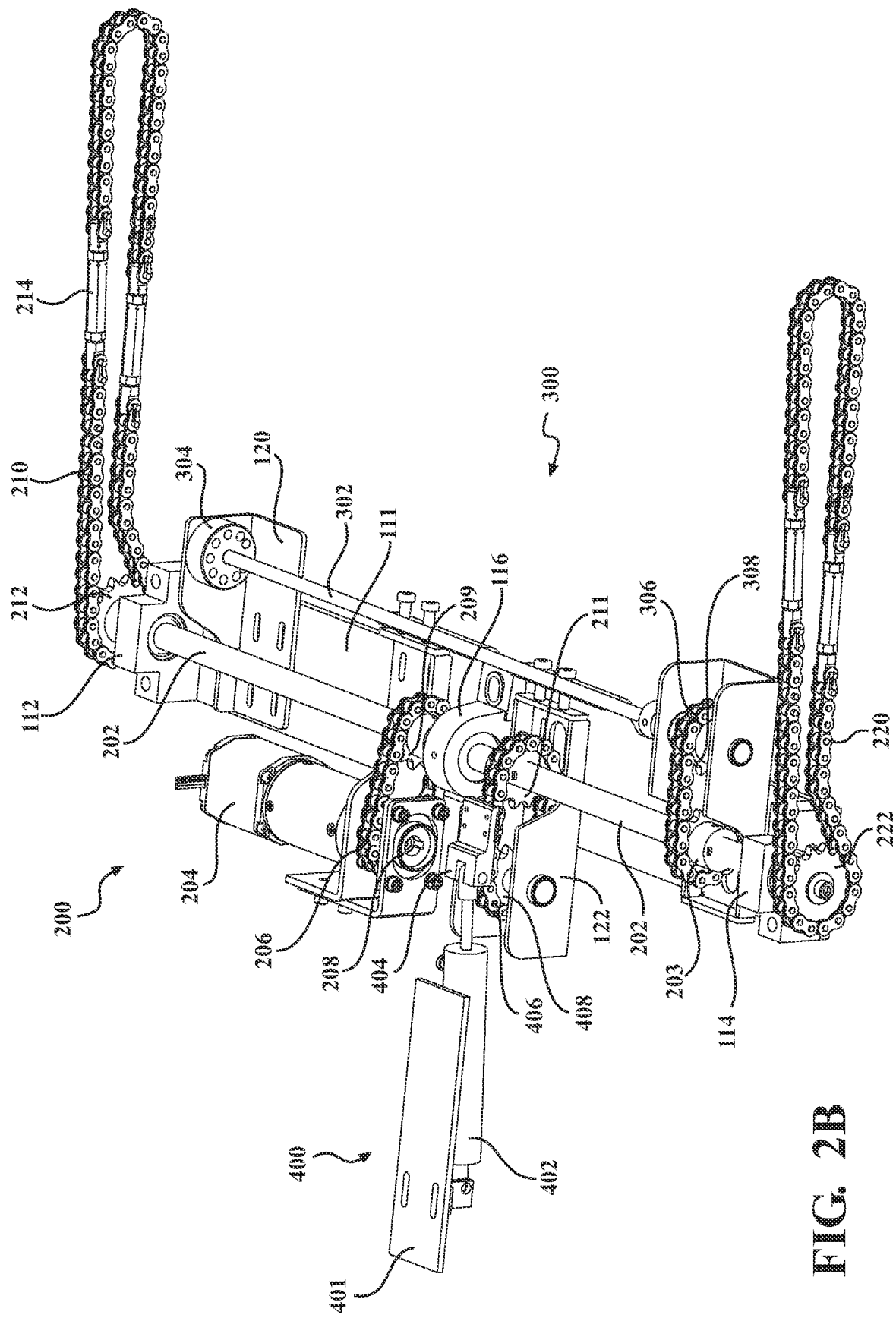
FIG. 2B schematically depicts an isometric view of the ramp assembly of FIG. 2A, according to one or more embodiments shown and described in this disclosure.

FIG. 2B shows the drive assembly 200, the restraint assembly 300, and the damper assembly viewed from a different angle that is opposite to that of FIG. 2A.

Figure 2C:
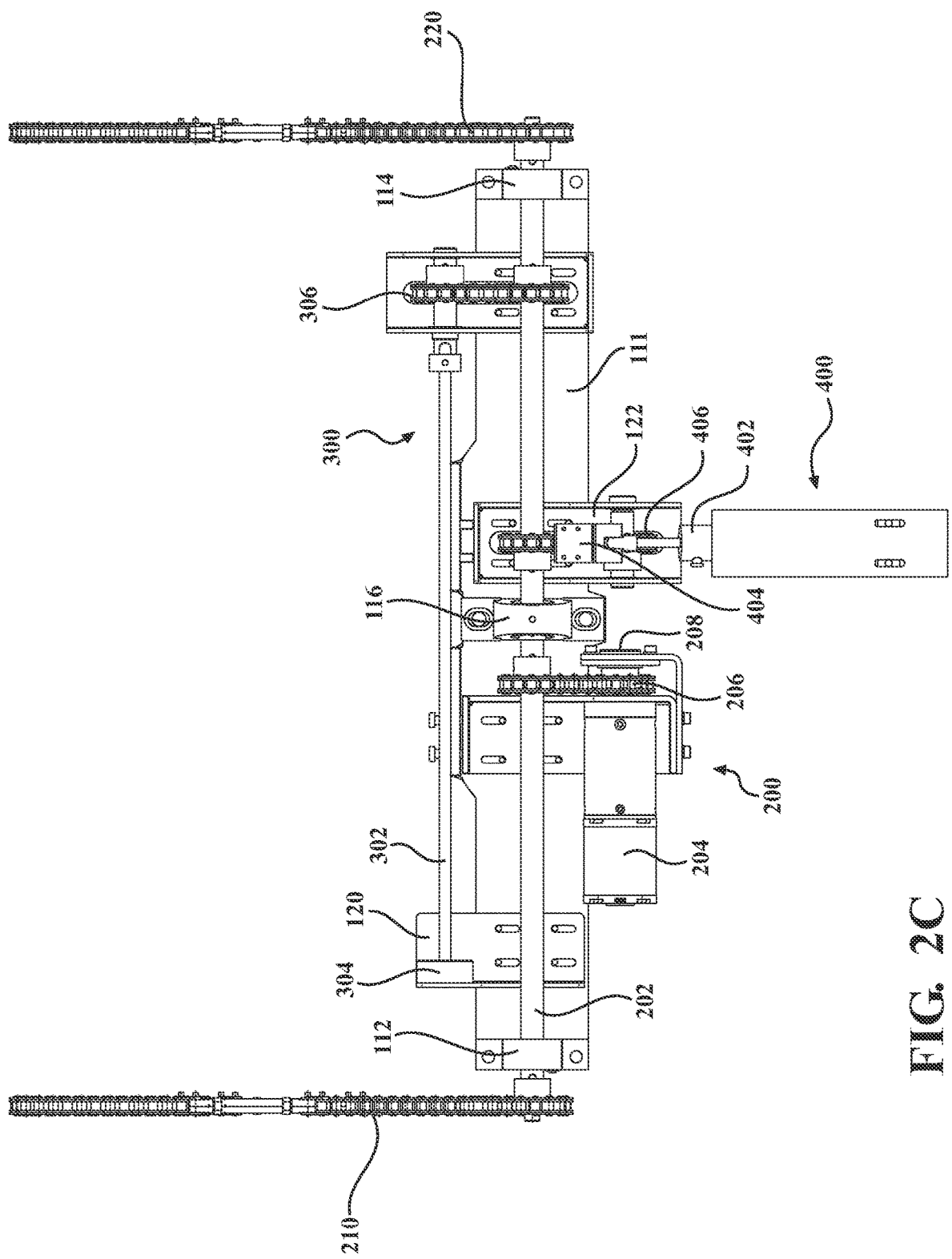
FIG. 2C schematically depicts an isometric view of the ramp assembly of FIG. 2A, according to one or more embodiments shown and described in this disclosure.

FIG. 2C shows the drive assembly 200, the restraint assembly 300, and the damper assembly viewed from the top. The torsion bar 302 may be disposed substantially parallel to the drive shaft 202 and in a distance to the torsion bar 302 in a direction transverse to the longitudinal axis of the torsion bar 302. The drive element 210 and the drive element 220 may be disposed substantially parallel to each other and substantially perpendicular to the drive shaft 202 or to the torsion bar 302 or both. Also, the damper 402 may be disposed substantially perpendicular to the drive shaft 202.

While the embodiments of FIGS. 1A-1C and 2A-2C illustrate a ramp assembly 100 having a damper assembly 400, in some embodiments the damper assembly 400 may be omitted.

Figure 3:
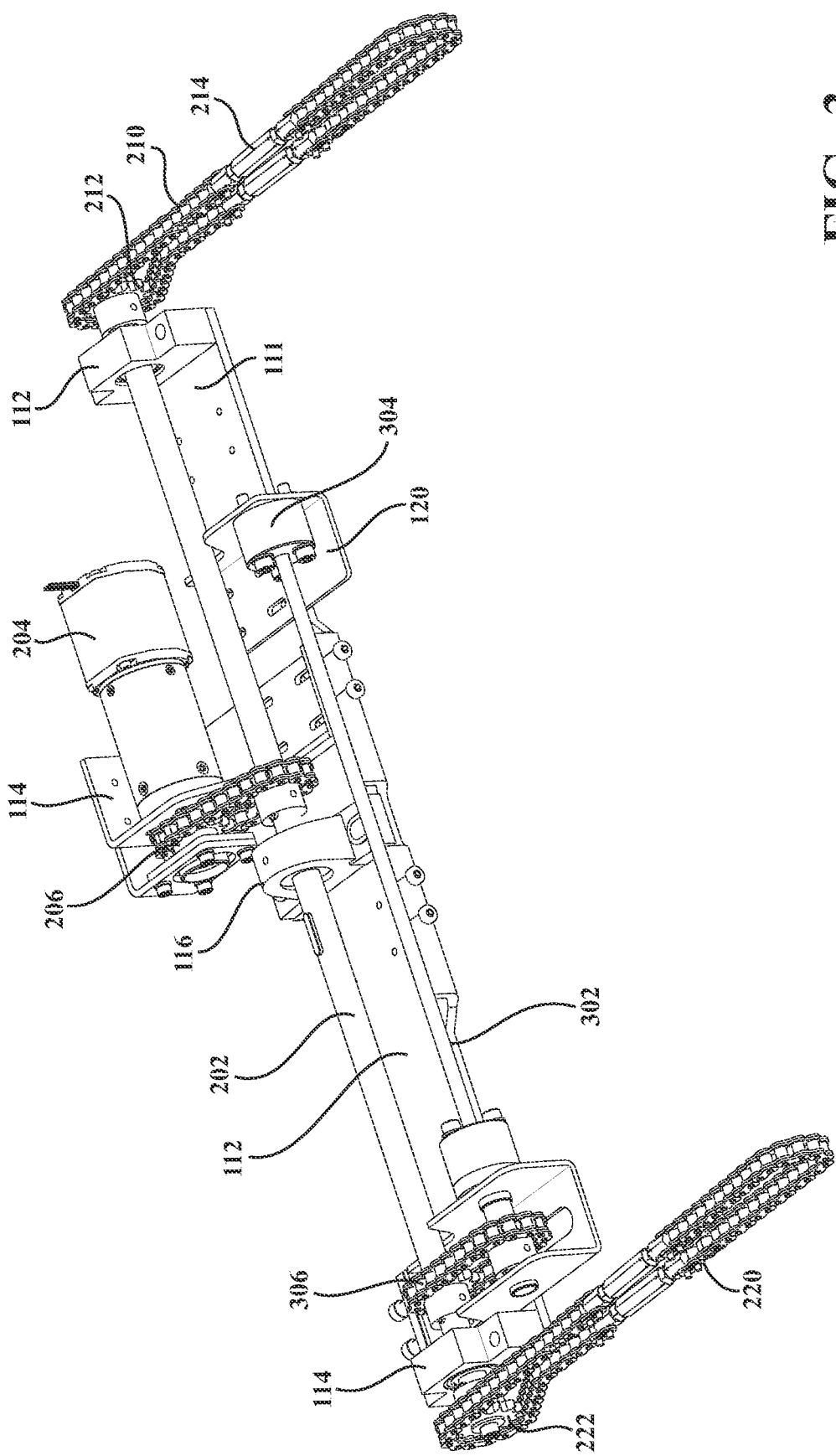
FIG. 3 schematically depicts a ramp assembly without a damper assembly, according to one or more embodiments shown and described in this disclosure.
Figure 4A:
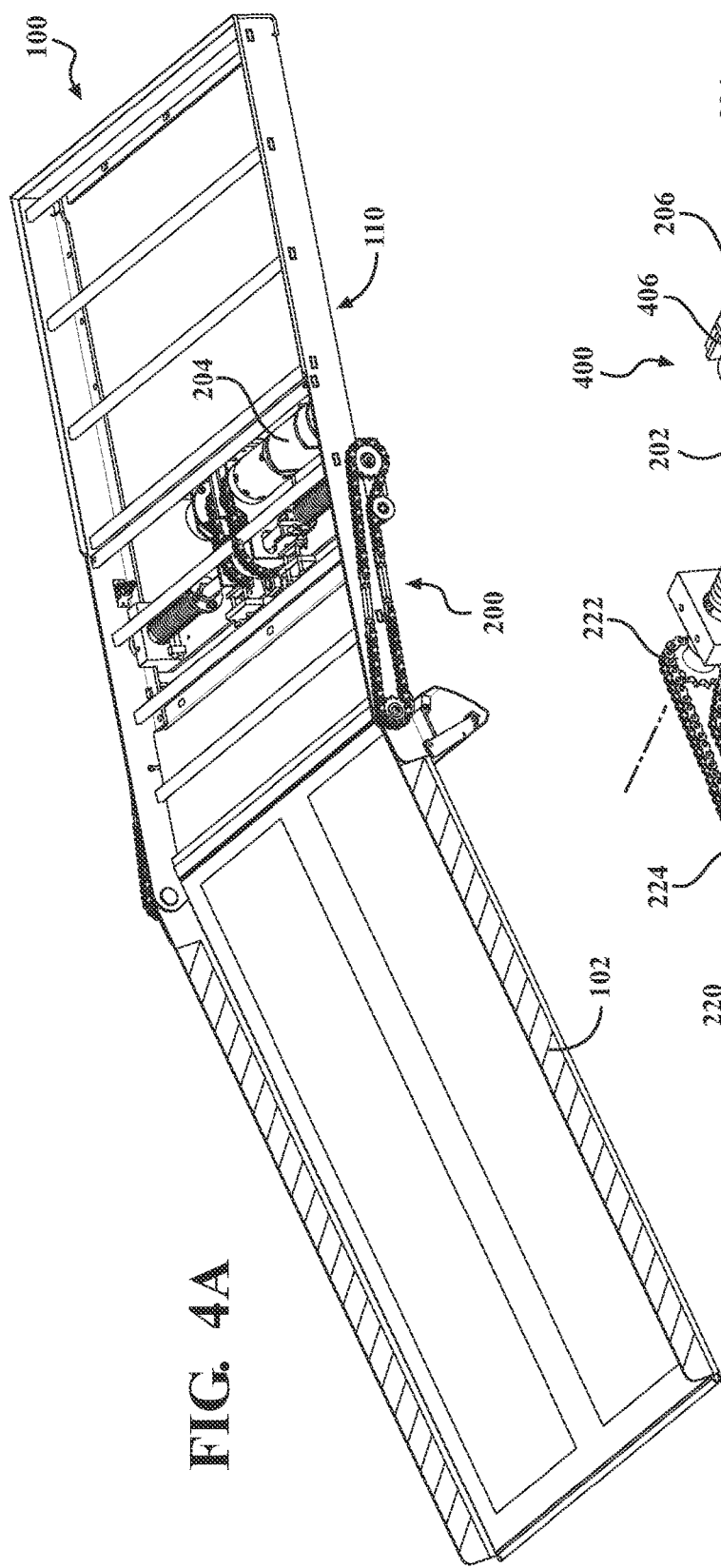
FIGS. 4A-4D schematically depict a restraint assembly with a torsion spring and associated components of the ramp assembly, according to one or more embodiments shown and described in this disclosure.
Figure 4B:
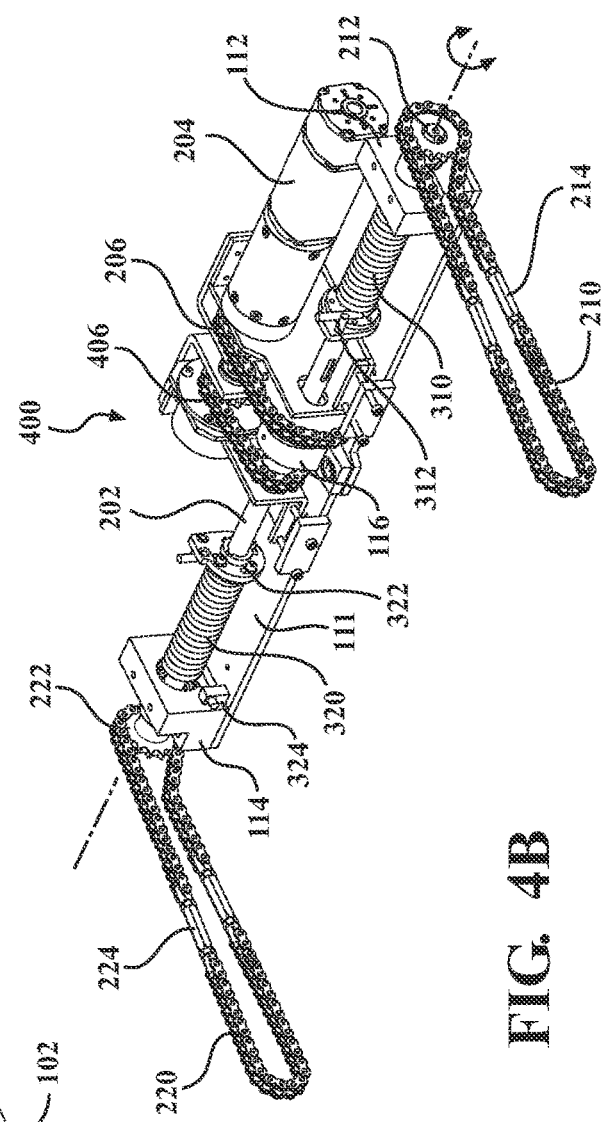
Figure 4C:
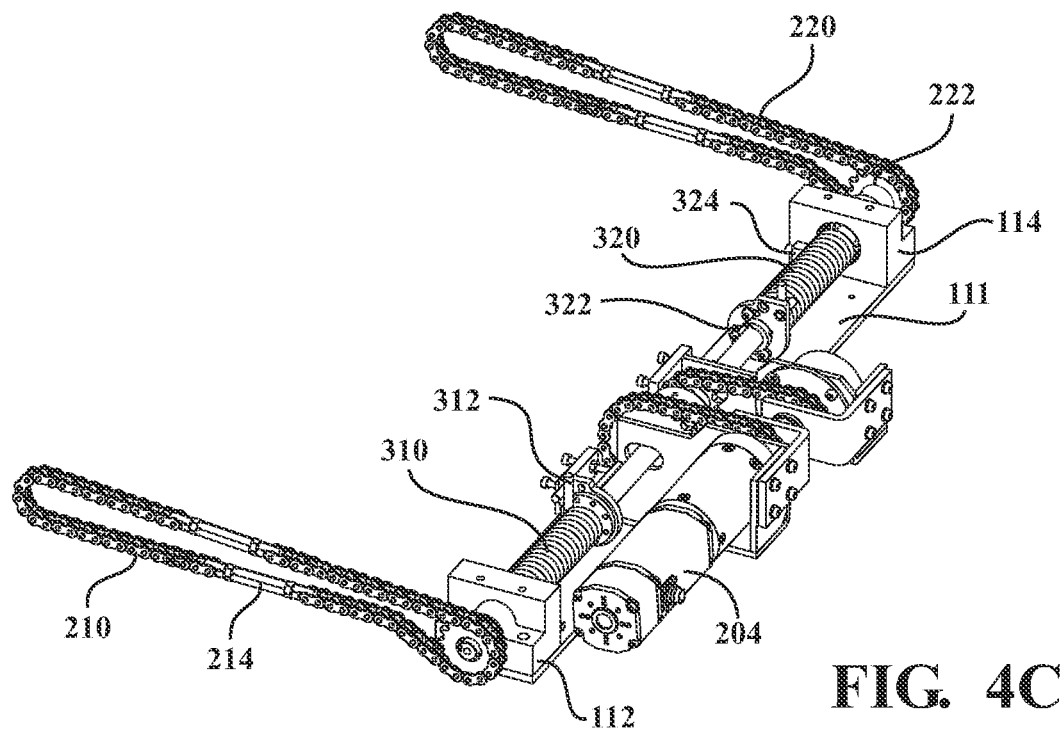
Figure 4D:
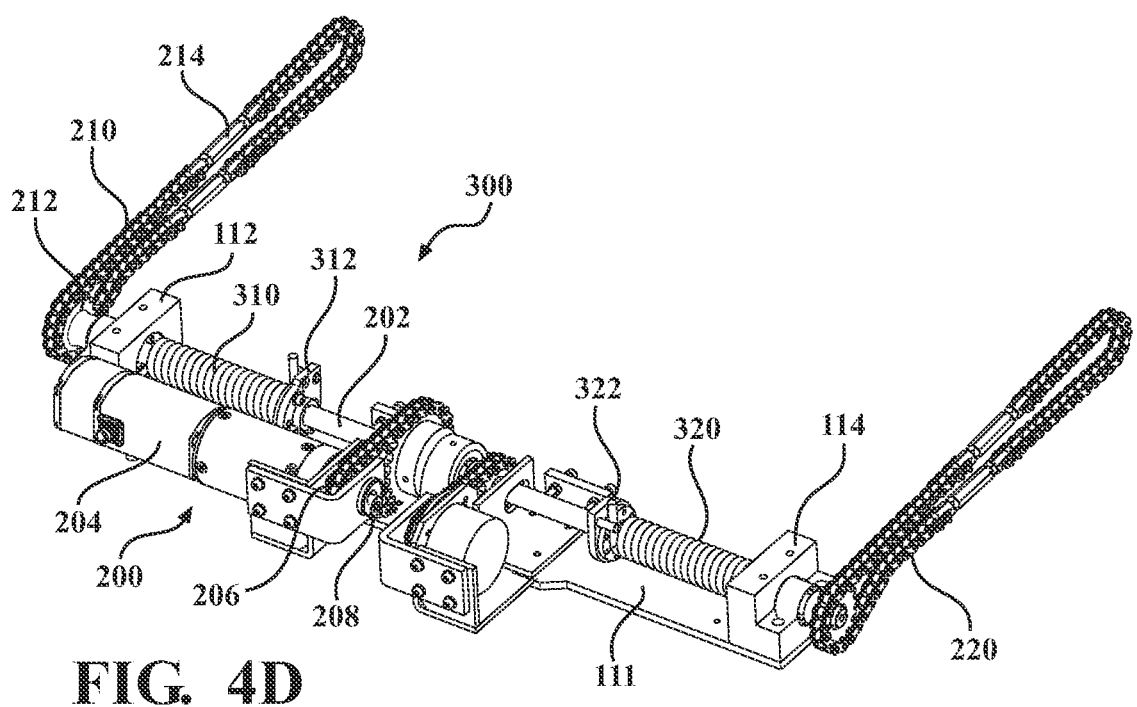

FIG. 3 illustrates a ramp assembly 100 without a damper assembly 400 according to one or more embodiments. In the embodiment illustrated in FIG. 3, like reference numbers refer to like elements and repeated description thereof is omitted for conciseness. The ramp assembly 100 may operate without the damper assembly 400.

FIGS. 4A-4D schematically illustrate a restraint assembly with torsion springs and associated components of the ramp assembly, according to one or more embodiments. In the embodiment illustrated in FIGS. 4A-4D, like reference numbers refer to like elements and repeated description thereof is omitted for conciseness. Referring to FIGS. 4A-4D, one embodiment of the restraint assembly 300 may include a pair of torsion springs 310 and 320 as a restraint. The torsion spring 310 is wrapped around the drive shaft 202 and is placed between end supports 312 and 314. The end support 312 is coupled to the drive shaft 202 and the end support 314 is mounted onto the base plate 111. In operation, when the ramp 102 is in the fold-in position, the torsion spring 310 is twisted between the end supports 312 and 314 in a clockwise direction and generates a moment that acts to rotate the drive shaft 202 in a counter-clockwise direction such that the ramp 102 rotates toward the neutral position from the fold-in position. When the ramp 102 is in the fold-out position, the torsion spring 310 is in a neutral state, which means that the torsion spring 310 is disengaged or unloaded such that the torsion spring 310 is not twisted.

Similarly, the torsion spring 320 is wrapped around the drive shaft 202 and is placed between end supports 322 and 324. The end support 322 is coupled to the drive shaft 202 and the end support 324 is mounted onto the base plate 111. In operation, when the ramp 102 is in the fold-out position, the torsion spring 320 is twisted between the end supports 322 and 324 in a counter-clockwise direction and generates a moment that acts to rotate the drive shaft 202 in a clockwise direction such that the ramp 102 rotates toward the neutral position from the fold-out position. When the ramp 102 is in the fold-in position, the torsion spring 320 is in a neutral state, which means that the torsion spring 320 is disengaged or unloaded such that the torsion spring 320 is not twisted.

In other words, when the ramp 102 is in the fold-in position, the torsion spring 310 is loaded and thereby twisted and the torsion spring 320 is unloaded and thereby not twisted. In contrast, when the ramp 102 is in the fold-out position, the torsion spring 310 is unloaded and thereby not twisted and the torsion spring 320 is loaded and thereby twisted.

The torsion springs 310 and 320 may be modified such that the torsion spring 310 exerts a moment that acts to rotate the drive shaft 202 clockwise, and the torsion spring 320 exerts a moment that acts to rotate the drive shaft 202 counter-clockwise. The torsion springs 310 and 320 may be helical springs or spiral springs. Further, additional torsion springs may be used to generate a stronger moment for better assistance of operation of the ramp 102. Instead of a pair of torsion springs, one double torsion spring may be used to reduce the number of parts. Instead of wrapping the torsion springs 310 and 320 around the drive shaft 202, the torsion springs 310 and 320 may be positioned on a separate shaft (not shown) extending more or less parallel and spaced to the drive shaft. In such an embodiment the torsion springs may be twisted between respective end supports provided on the separate shaft in a similar manner as described above. The separate shaft may be coupled to the drive shaft via connectors (e.g., chains) such that the separate shaft rotates in parallel to a rotation of the drive shaft.

In case the drive assembly is not in use or there is a power failure, the resistant from the drive assembly or other components may add resistance to the movement of the ramp 102. Manually moving the ramp 102, therefore, requires some assistance or support mechanism. The restraint assembly 300 may act as a support mechanism that provides a moment to reduce the resistance from the drive assembly or other components and may make the operation of the ramp 102 easier than without the restraint assembly 300.

Figure 5:
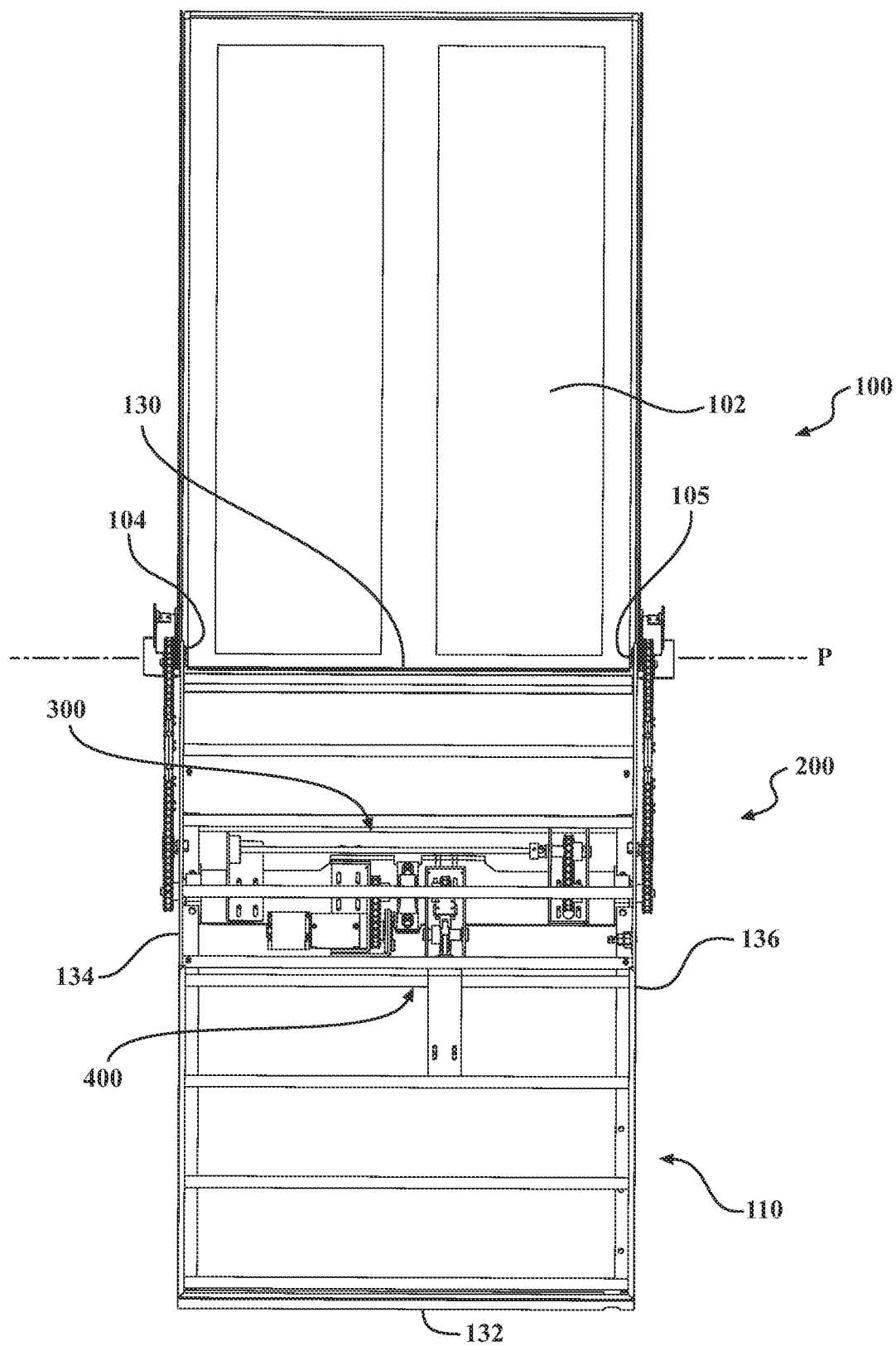
FIG. 5 schematically depicts a layout of a drive assembly, a restraint assembly, and a damper assembly with respect to a frame of a ramp assembly, according to one or more embodiments shown and described in this disclosure.

FIG. 5 depicts a layout of the ramp assembly 100 viewed from the top. The frame 110 may include four sides 130, 132, 134, and 136 that form a rim of a substantially rectangular shape of the frame. The first side 130 is located where the ramp pivots 104 and 105 are located, and the ramp 102 pivots around the pivot axis P at the first side 130. The second side 132 is located opposite to the first side 130. The third side 134 is located where the drive element 210 is located and is substantially perpendicular to the first side 130 and the second side 132. The fourth side 136 is located opposite to the third side 134 where the drive element 220 is located and is substantially perpendicular to the first side 130 and the second side 132.

The restraint assembly 300 may be arranged to be placed between the third side 134 and the fourth side 136 such that the space in the frame 110, which is surrounded by the four sides 130, 132, 134, and 136, may be used efficiently. Also, the restraint assembly 300 is operatively connected to the drive assembly 200, and arranging the restraint assembly 300 near the drive assembly 200 in the space between the third side 134 and the fourth side 136 may result in a compact width of the ramp assembly 100.

The restraint assembly 300 may be arranged to be placed closer to the first side 130 than the second side 132. The first side 130 generally has better accessibility for maintenance because the first side 130 often is placed toward the exterior of the installed location, and the second side 132 often is placed toward the interior of the installed location so that the ramp 102 folds out toward the outside. The location of the restraint assembly 300 may be changed depending on the installation arrangement of the ramp assembly 100. The restraint assembly 300 may be arranged to be placed between the first side 130 and the drive assembly 200 for better accessibility for maintenance purposes. The restraint assembly 300 may be arranged to be placed closer to the first side 130 than the second side and also placed between the first side 130 and the drive assembly 200.

The drive assembly 200 may be arranged to be placed between the third side 134 and the fourth side 136 such that the space in the frame 110, which is surrounded by the four sides 130, 132, 134, and 136, may be used efficiently. The drive assembly 200 may be arranged to be placed closer to the first side 130 than the second side 132 for accessibility because the first side 130 generally has better accessibility for maintenance. Also, such arrangement may reduce the length of the drive elements 210 and 220, which may improve chain-drive efficiency. The location of the drive assembly 200 may be changed depending on the installation arrangement of the ramp assembly 100. A length and/or position of the drive elements 210 and 220 may be variously changed to adapt to the location of the restraint assembly 300.

Figure 6C:
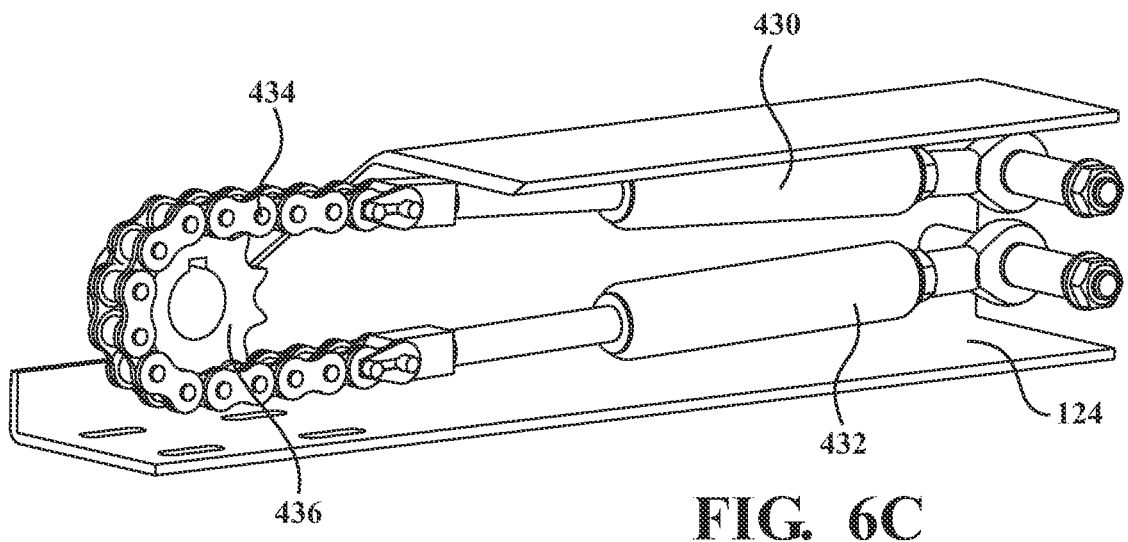
FIG. 6C schematically depicts a damper assembly with a pair of dampers coupled to each other via a damper chain, according to one or more embodiments shown and described in this disclosure.

Referring to FIGS. 6A, 6B, 6C, and 6D, examples of the damper assembly 400 are shown. FIG. 6A depicts the damper assembly 400 that is also shown in FIGS. 1A-1C and 2A-2B. The damper 402 may comprise a linear double-acting oil feed brake. One end of the damper 402 is connected to the drive shaft 202 via the damper chain 406 and the damper coupler 404. The damper chain 406 is coupled to a damper axis 408 and a damper gear 407 that is coupled to the drive shaft 202. The other end of the damper 402 is connected to the damper plate 401 that is fixedly supported by the frame 110. When the ramp 102 is in the neutral position, the damper coupler 404 is located at a middle position between the damper axis 408 and the damper gear 407. When the ramp 102 is moved toward the fold-in position or toward the fold-out position, the damper 402 generates a counter force for smooth ramp operation, so that the ramp 102 does not move abruptly. The velocity of a rotation of the ramp 102 may be limited to a maximal value pre-defined by the damper 402.

FIG. 6B depicts a pair of dampers 410 and 420, which may be single-acting oil feed brakes. The damper 410 is coupled to the ramp pivot 104 via a pivot connector 412 at one end. The other end of the damper 410 is coupled to the drive element 210 via a chain connector 414. The drive element 210 is further coupled to the drive shaft 202 (not shown in FIG. 6B). The damper 410 generates a counter force when the ramp 102 is moved toward the fold-in position for smooth ramp operation. Similarly, the damper 420 is coupled to the ramp pivot 105 via a pivot connector 422 at one end. The other end of the damper 420 is coupled to the drive element 220 via a chain connector 424. The drive element 220 is further coupled to the drive shaft 202 (not shown in FIG. 6B). The damper 420 generates a counter force when the ramp 102 moves toward the fold-out position for smooth ramp operation. The dampers 410 and 420 may generate braking force in a pull direction.

FIG. 6C depicts a pair of dampers 430 and 432, which may be single-acting oil feed brakes. The dampers 430 and 432 are coupled to a damper plate 124 that is fixedly mounted onto the frame 110 at one end. The other end of the dampers 430 and 432 are coupled to a damper chain 434. The damper chain 434 is coupled to a damper gear 436 that is coupled to the drive shaft 202. The damper 430 generates a counter force when the ramp 102 is moved toward the fold-in position, and the damper 432 generates a counter force when the ramp 102 is moved toward the fold-out position for smooth ramp operation. The dampers 430 and 432 may generate braking force in a pull direction.

Figure 6D:
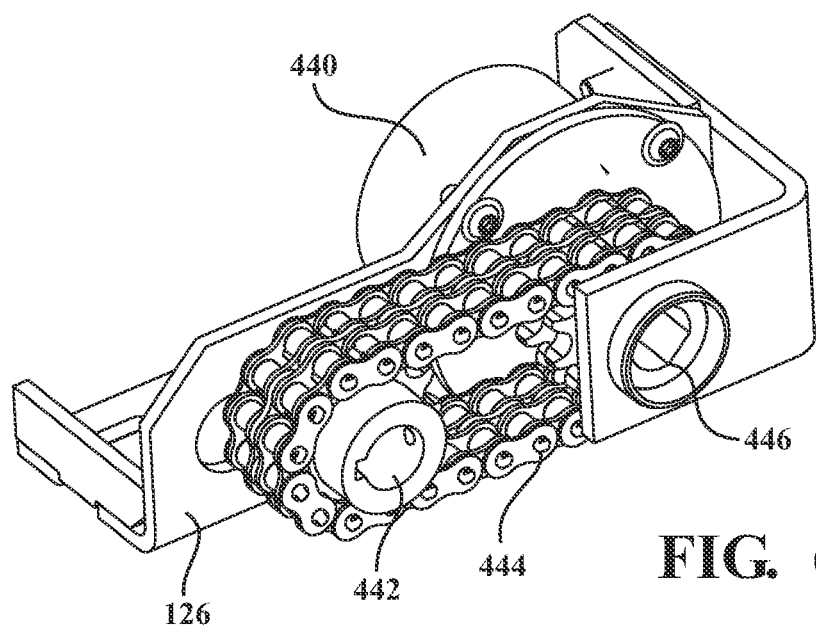
FIG. 6D schematically depicts a damper assembly with a rotary damper, according to one or more embodiments shown and described in this disclosure.

FIG. 6D depicts a rotary damper 440, which may be a rotary brake. The rotary damper 440 is operatively coupled to the drive shaft 202 via a damper chain 444. The damper chain 444 is coupled to a damper axis 446 and a damper gear 442 that is coupled to the drive shaft 202. The rotary damper 440 is fixedly mounted to the frame 110 via a damper plate 126. The rotary damper 440 generates a counter force when the ramp 102 is moved toward the fold-in position and the fold-out position for smooth ramp operation. The rotary damper 440 may have a braking force adjuster (not shown) to adjust the braking force.

Figure 6E:
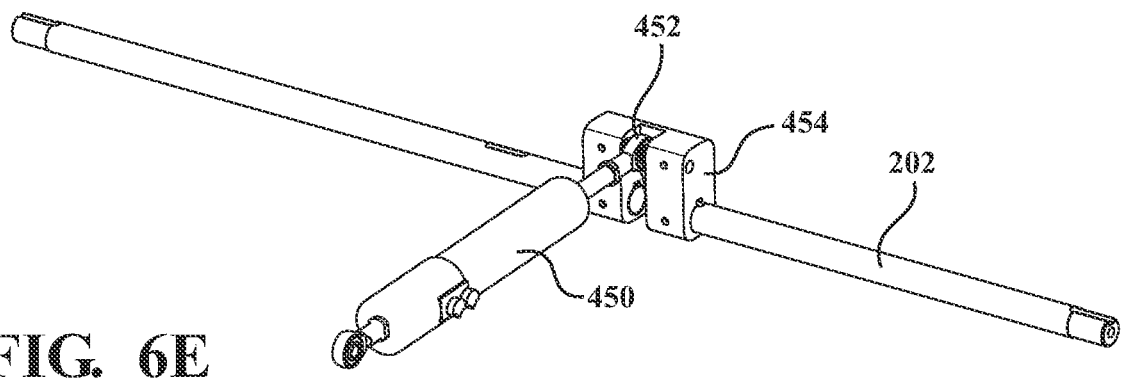
FIG. 6E schematically depicts a damper assembly with a damper, according to one or more embodiments shown and described in this disclosure.
Figure 7A:
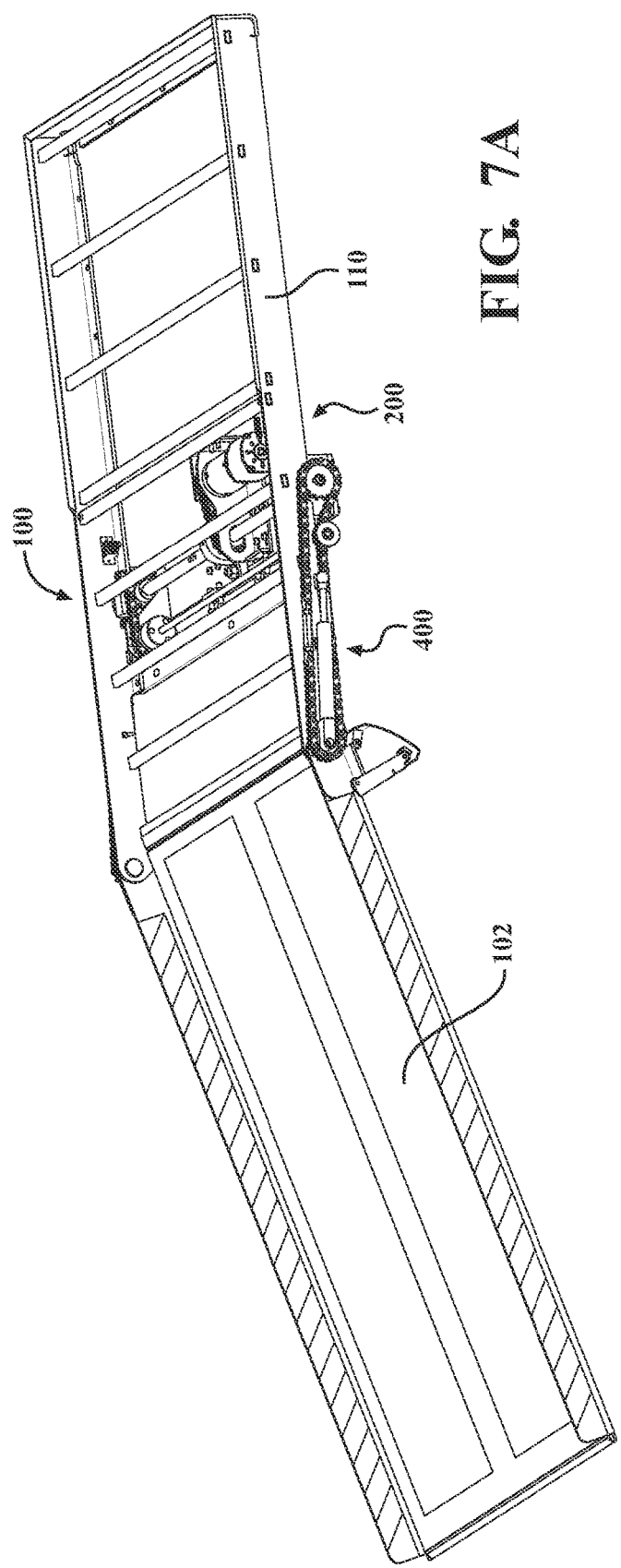
FIGS. 7A-7D schematically depict the damper assembly of FIG. 6B coupled to a drive assembly, according to one or more embodiments shown and described in this disclosure.
Figure 7B:
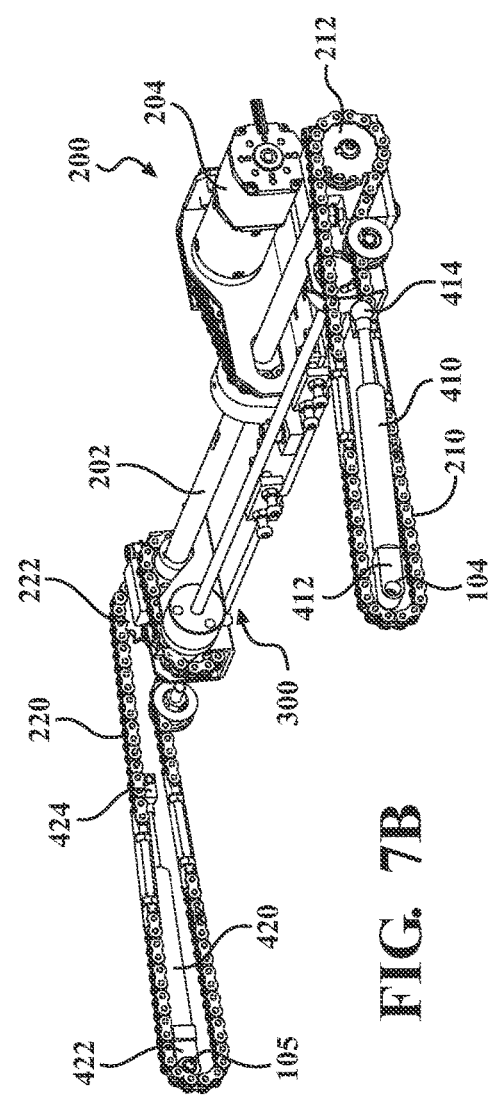
Figure 7C:
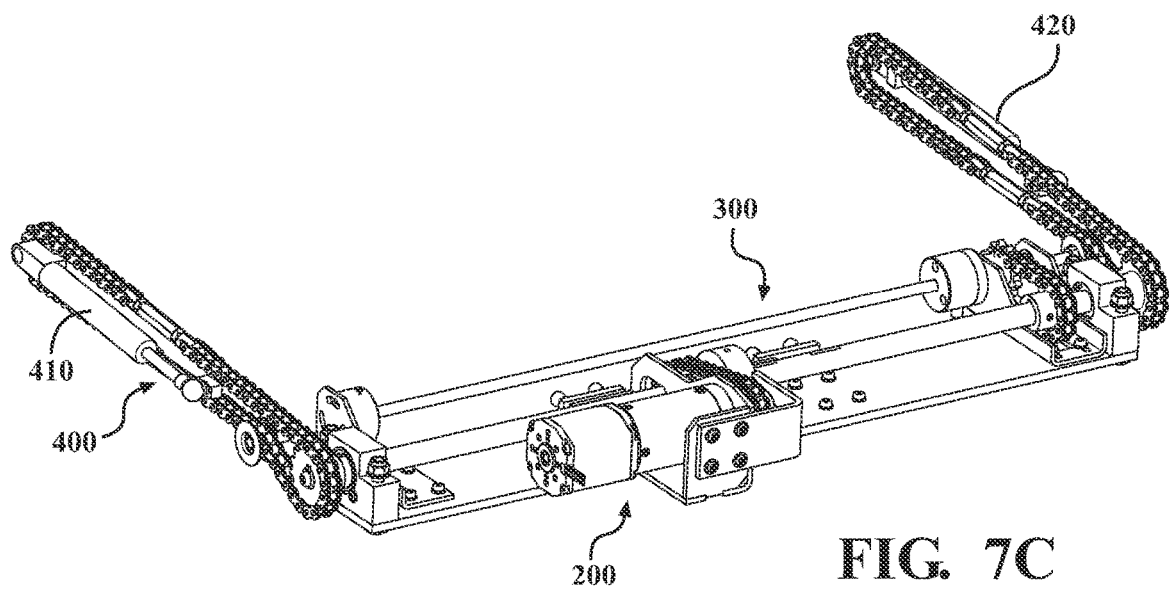
Figure 7D:
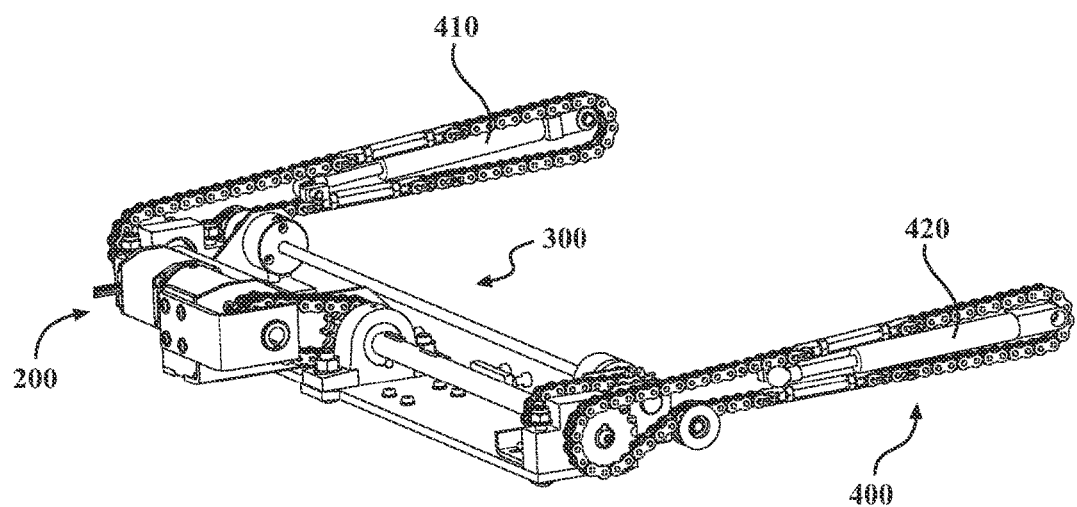
Figure 8A:
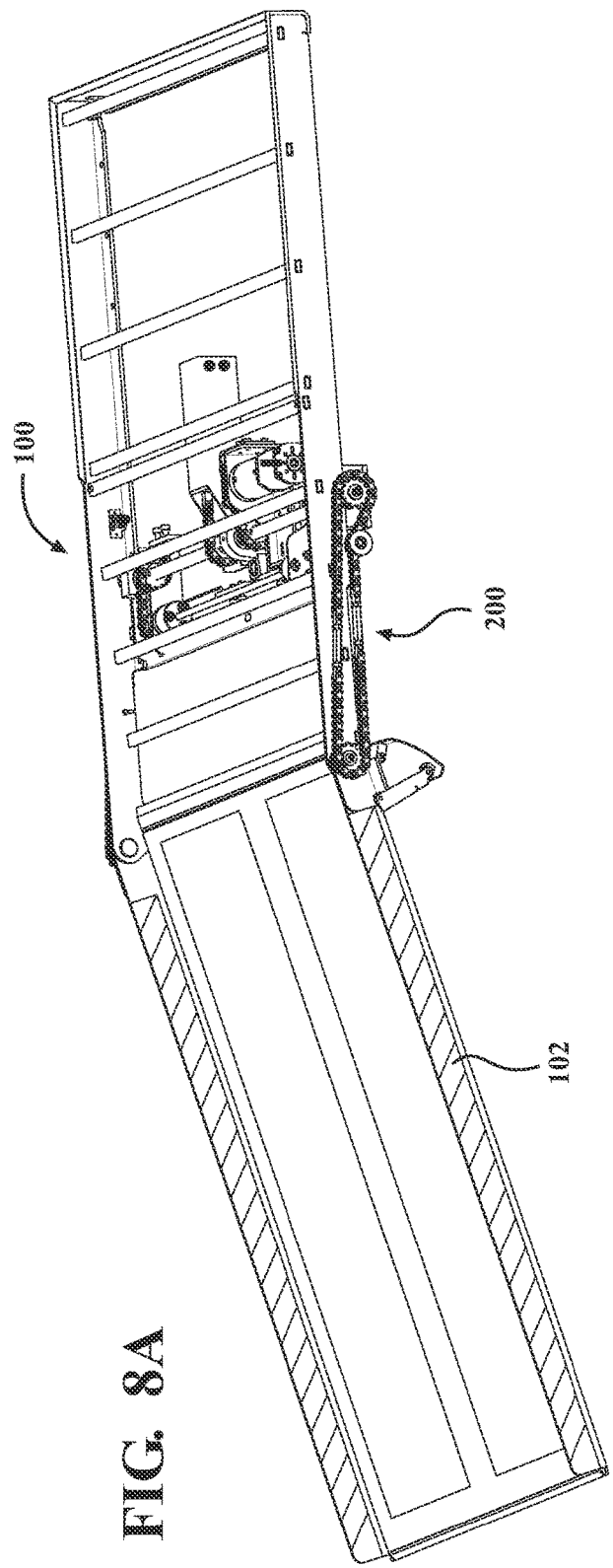
FIGS. 8A-8D schematically depict the damper assembly of FIG. 6C coupled to a drive assembly, according to one or more embodiments shown and described in this disclosure.
Figure 8B:
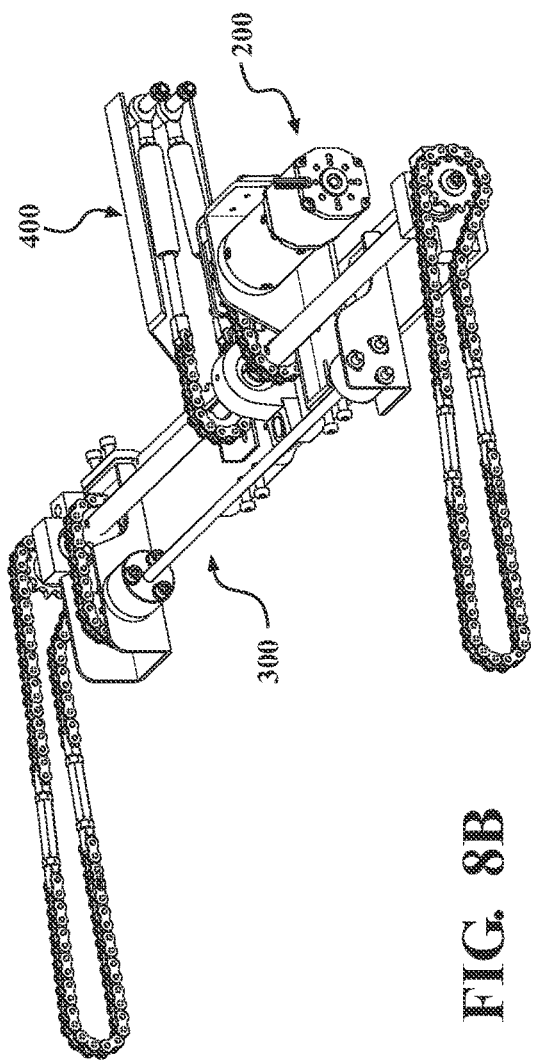
Figure 8C:
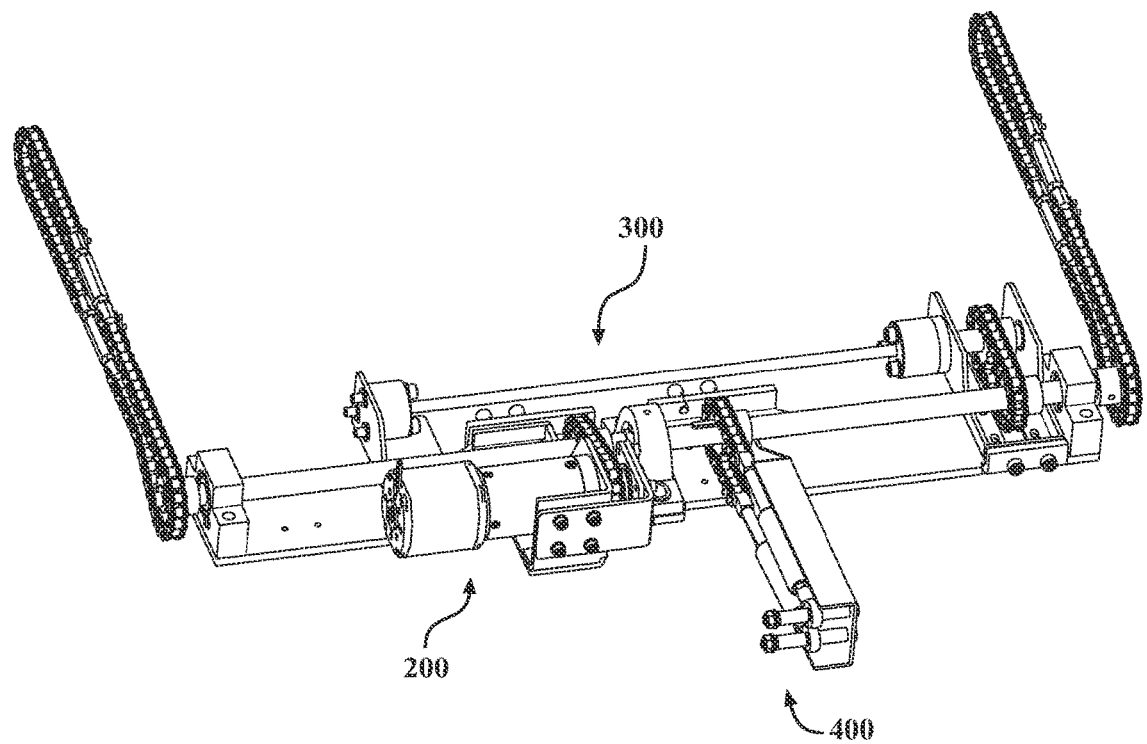
Figure 8D:
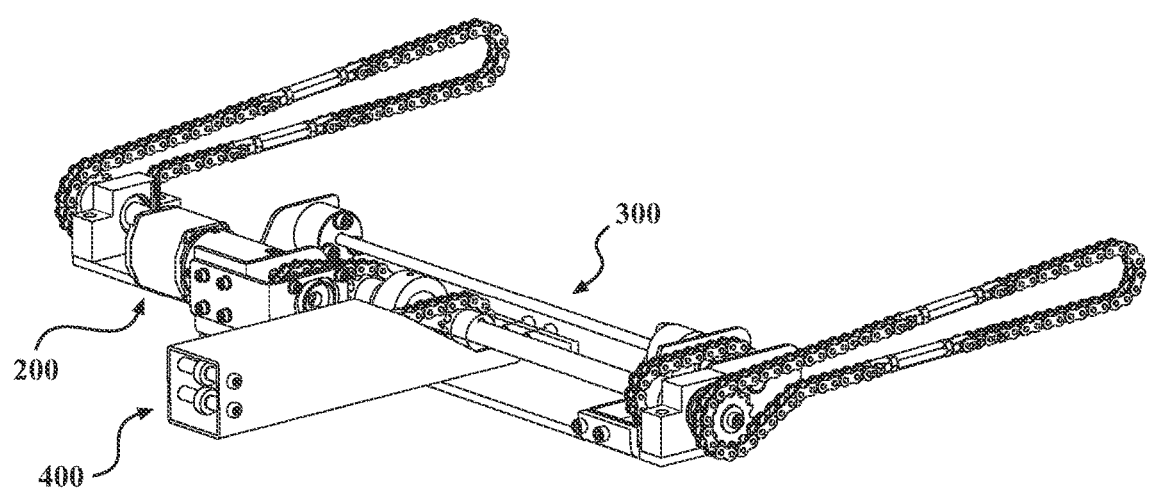
Figure 9C:
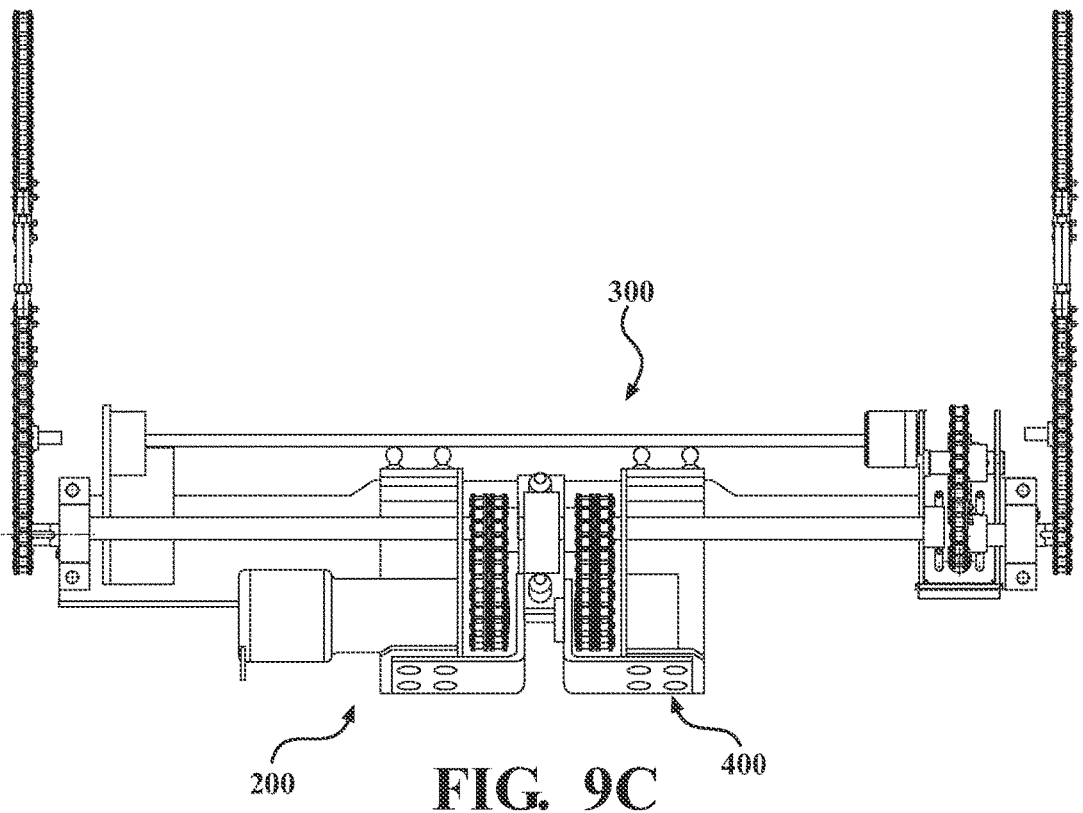
Figure 9D:
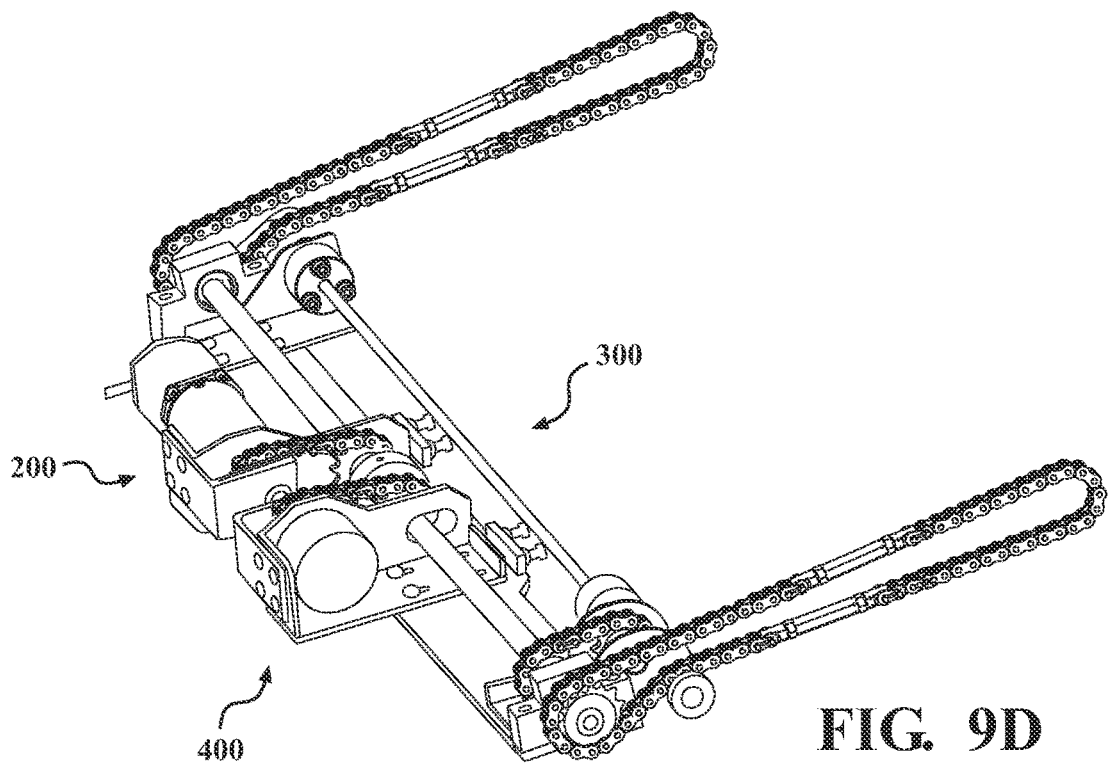

FIG. 6E depicts a damper 450, which may comprise a liner double-acting oil feed brake. One end 452 of the damper 450 is connected to the drive shaft 202 via a crank 454. The crank 454 may provide an eccentric movement of the damper 450 unproportional to the drive shaft 202. When the ramp 102 is in the neutral position, the damper 450 may move the fastest, and a damping force of the damper 450 may be the strongest in the neutral position compared to when the ramp 102 is in the fold-in or fold-out position. On the contrary, the damper 450 produces less counterforce to the drive shaft 202 when the ramp 102 is in the fold-in position or fold-out position.

FIGS. 7A-7D show the ramp assembly 100 with the dampers 410 and 420, as explained above referring to FIG. 6B. The dampers 410 and 420 are operatively coupled to the drive shaft 202 via the side gears 212 and 222, respectively. In the embodiment illustrated in FIGS. 7A-7D, like reference numbers refer to like elements and repeated description thereof is omitted for conciseness.

FIGS. 8A-8D show the ramp assembly 100 with the dampers 430 and 432, as explained above referring to FIG. 6C. The dampers 430 and 432 are operatively coupled to the drive shaft 202 via the damper chain 434 that is coupled to the damper gear 436. In the embodiment illustrated in FIGS. 8A-8D, like reference numbers refer to like elements and repeated description thereof is omitted for conciseness.

FIGS. 9A-9D show the ramp assembly 100 with the rotary damper 440, as explained above referring to FIG. 6D. The rotary damper 440 is operatively coupled to the drive shaft 202 via the damper chain 444 that is coupled to the damper axis 446 and the damper gear 442. In the embodiment illustrated in FIGS. 9A-9D, like reference numbers refer to like elements and repeated description thereof is omitted for conciseness.

Figure 10A:
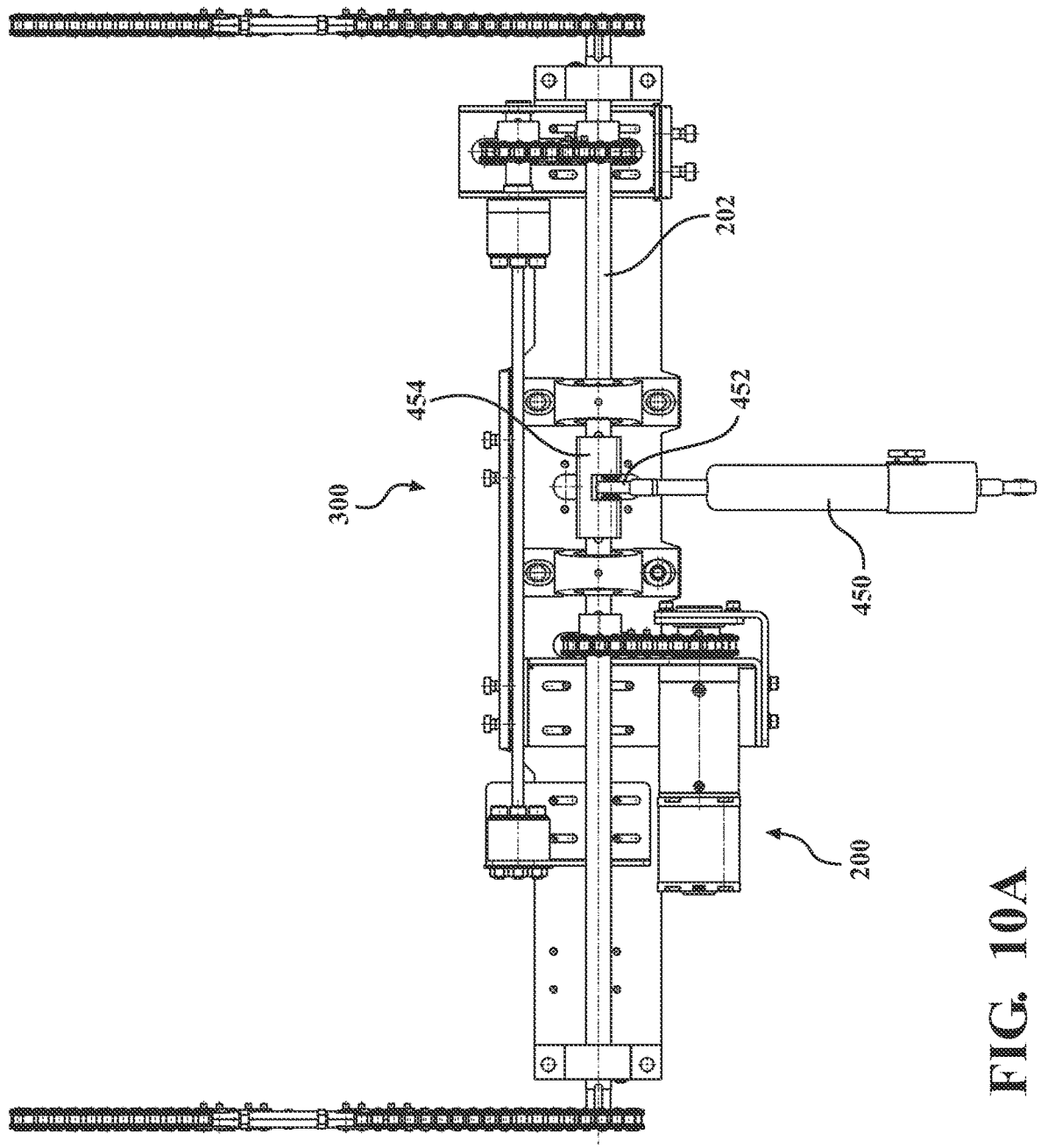
FIGS. 10A-10D schematically depict the damper assembly of FIG. 6E coupled to a drive assembly, according to one or more embodiments shown and described in this disclosure.
Figure 10B:
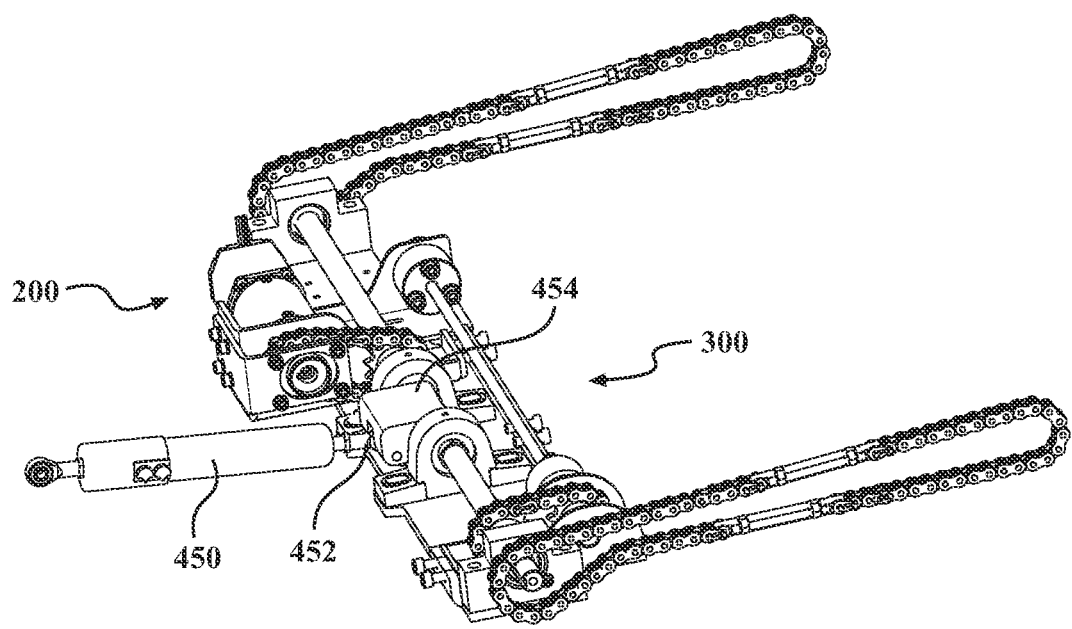
Figure 10C:
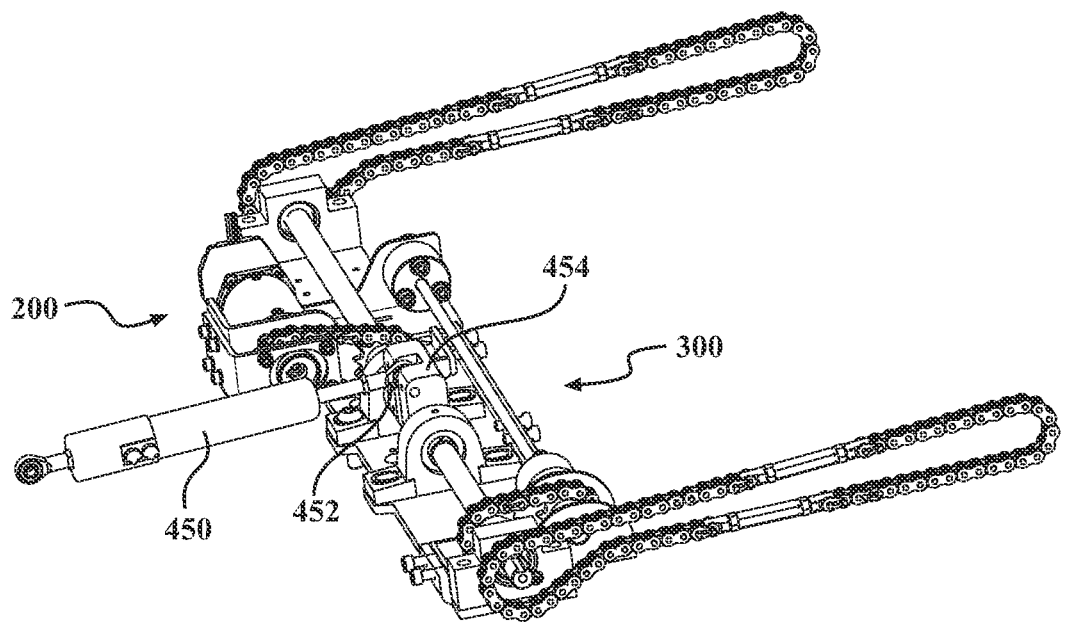
Figure 10D:
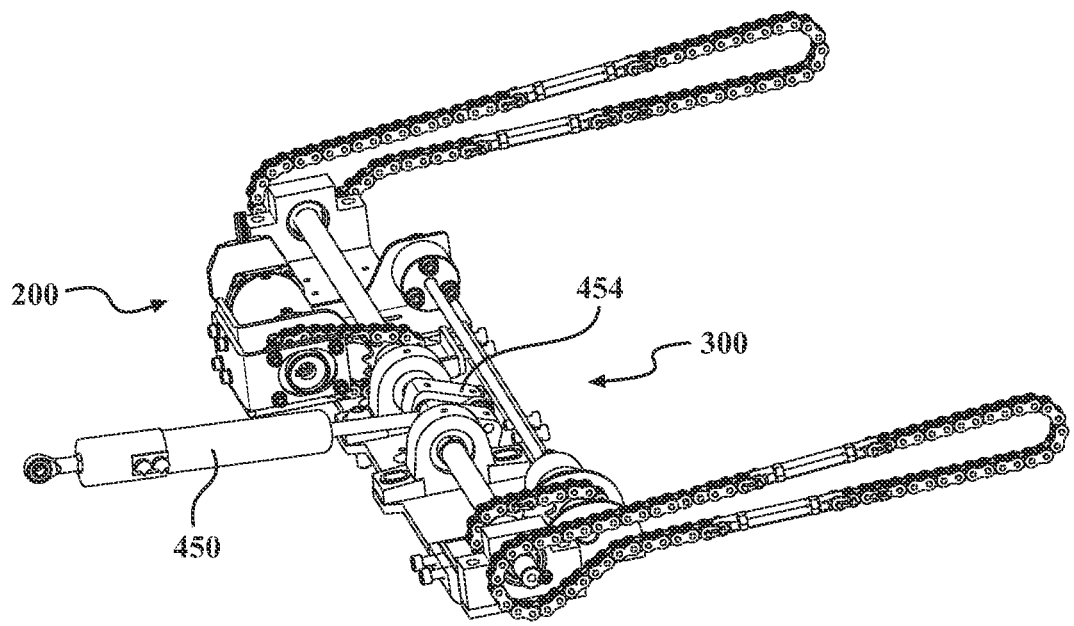
Figure 11A:
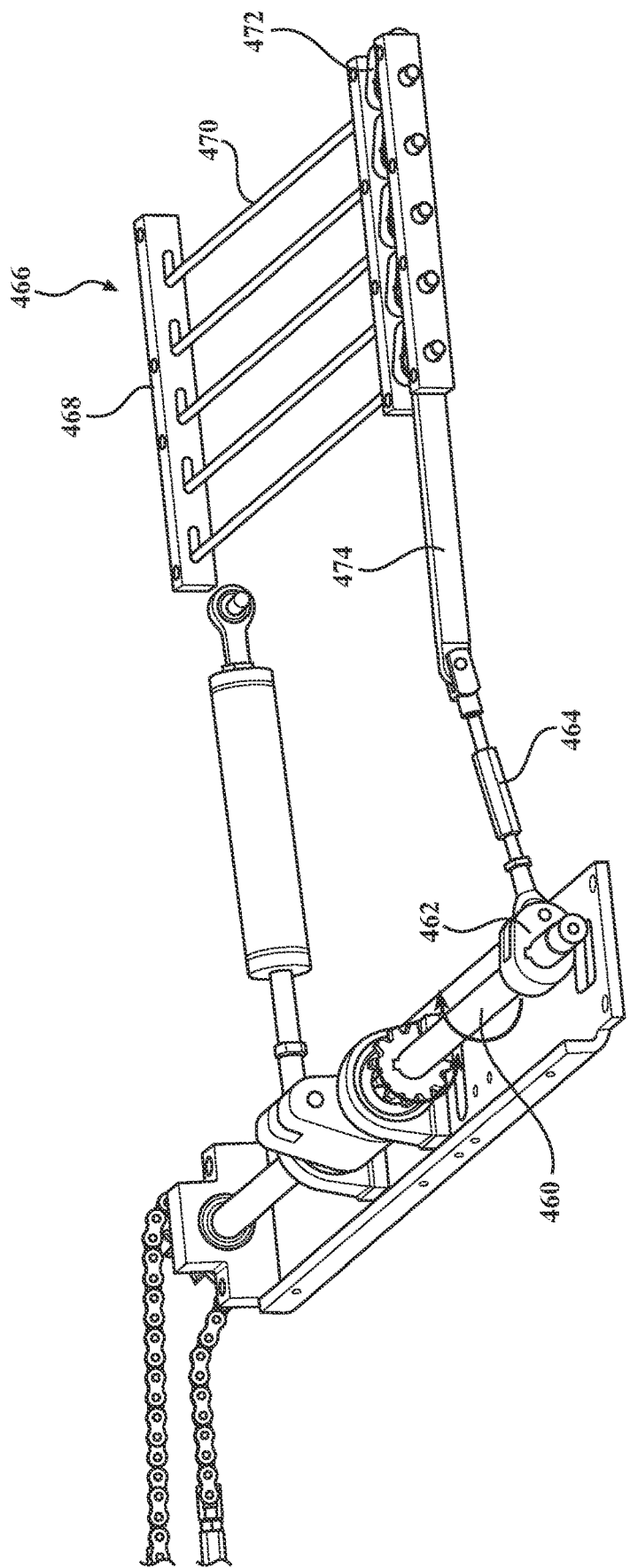
FIGS. 11A-11F schematically depict a further system with multiple torsion bars.
Figure 11B:
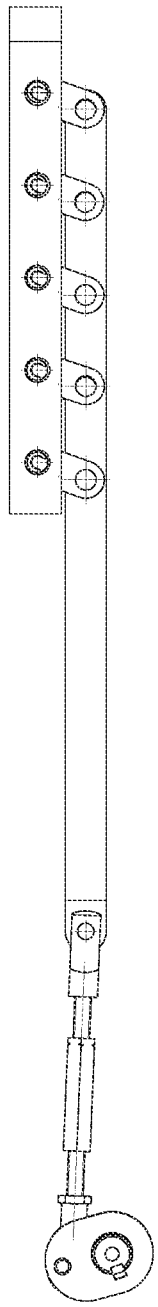
Figure 11C:
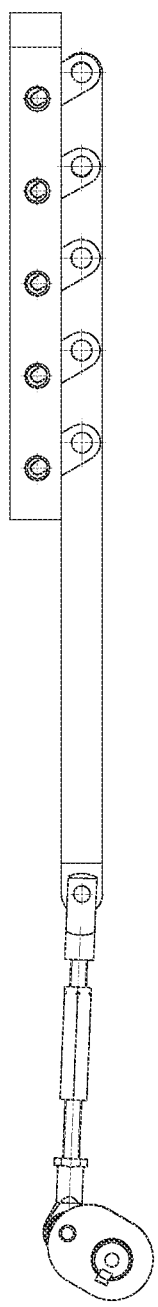
Figure 11D:
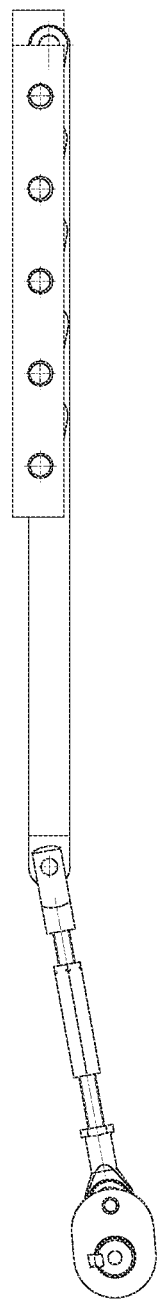
Figure 11E:
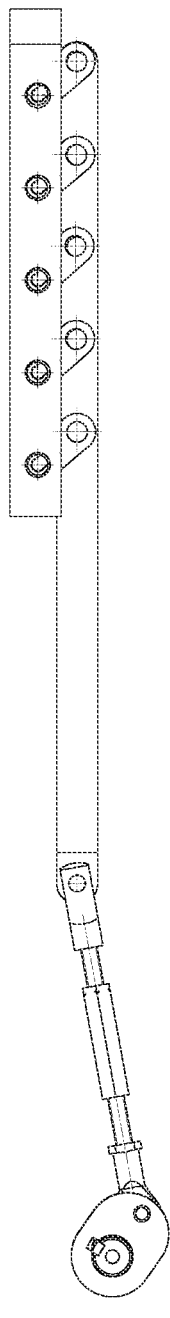
Figure 11F:
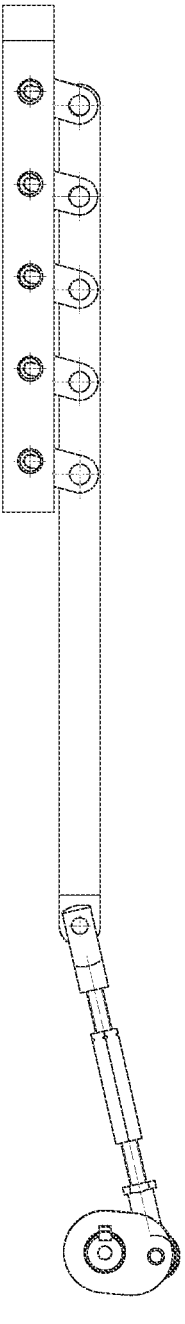

FIGS. 10A-10D show the ramp assembly 100 with the damper 450, as explained above referring to FIG. 6E. FIG. 10A shows that one end 452 of the damper 450 is connected to the drive shaft 202 via the crank 454. FIG. 10B shows the damper 450 being completely retracted when the ramp 102 is in the fold-in position. FIG. 10C shows the damper 450 being in a middle position when the ramp 102 is in the neutral position. FIG. 10D shows the damper 450 being extended when the ramp 102 is in the fold-out position. In the embodiment illustrated in FIGS. 10A-10D, like reference numbers refer to like elements and repeated description thereof is omitted for conciseness.

FIG. 11 shows a further design wherein the drive shaft 460 has a crank 462 connected to a link 464 such that rotation of the drive shaft causes reciprocating movement of the link. A torsion bar assembly 466 includes a frame 468 supporting a plurality of torsion bars 470. In this example, five torsion bars are supported. One end of each torsion bar is rotationally fixed to the frame and the opposite end of each torsion bar is connected to a reversing lever 472, which each act as a small crank arm. The distal end of each reversing lever 472 is connected to a pull bar 474 which is connected to the link 464. By this arrangement, rotation of the drive shaft 460 causes linear movement of the link 464 and the pull bar 474, which moves the distal ends of each of the reversing levers, thereby twisting or rotationally tensioning each of the torsion bars. FIGS. 11B-11F illustrated the movements of the system as the drive shaft rotates through more than 180 degrees. Because of the arrangement of elements, the rotation direction of the torsion bars is the same when the ramp moves from the neutral position to the fold-out position and when the ramp moves from the neutral position to the fold-in position. Further, because of the arrangement of elements, the torsion bars are not tensioned when the drive shaft is in the neutral position of FIG. 11D but are rotationally tensioned in one direction when the drive shaft rotates counterclockwise, illustrated as from FIG. 11D to FIG. 11B, and are rotationally tensioned in the opposite direction when the drive shaft rotates clockwise, illustrated as from FIG. 11D to FIG. 11F. In fact, it is not a requirement that the torsion bars are not tensioned at all when the drive shaft is in the neutral position of FIG. 11D. Instead, the torsion bars may be tensioned also in the neutral position of FIG. 11D, as long as the tensioning of the torsion bars in the neutral position is less than in the other positions during the movement from the neutral position to the fold-in position and the fold-out position, respectively. This system allows for easy changes in the number of torsion bars that are rotationally tensioned to accommodate different ramp weights.

Figure 12A:
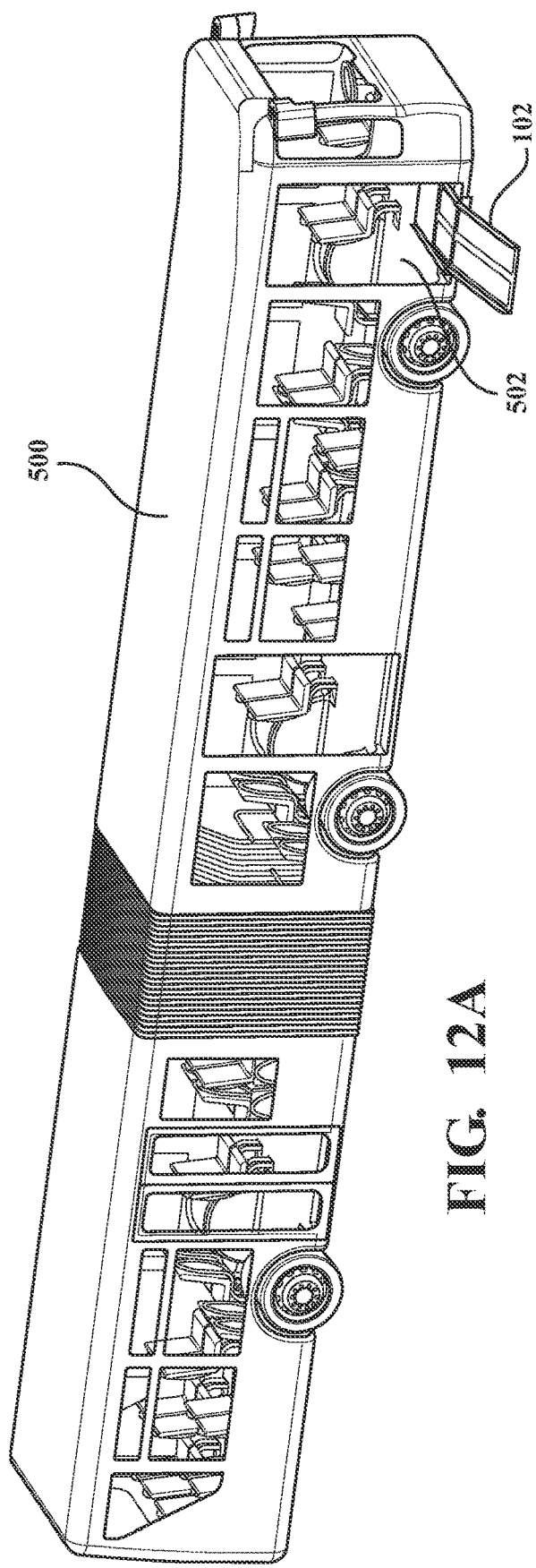
FIGS. 12A-12C schematically depict a vehicle with the ramp assembly being mounted in a floor region of a vehicle access.
Figure 12C:
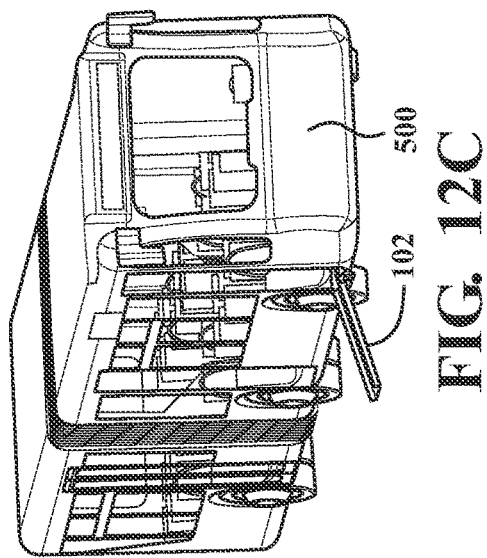
Figure 12B:
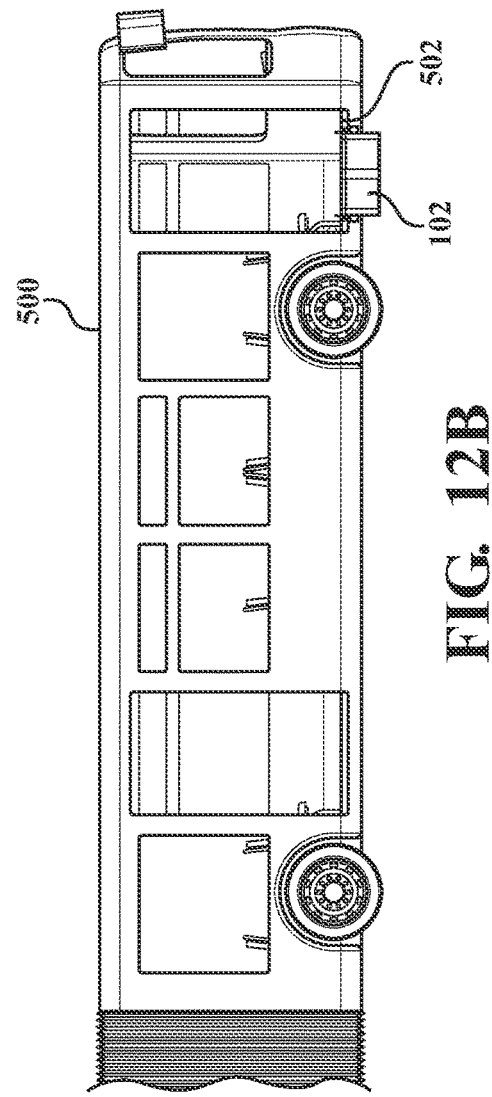

FIGS. 12A-12C show the ramp assembly 100 being mounted in a space in a floor 502 of a vehicle 500. Specifically, the ramp assembly 100 may be mounted in the space in the floor 502 in an entrance of the vehicle 500. The ramp 102 may be folded out to provide access to the vehicle 500 as shown in FIGS. 12A-12C. When the ramp 102 is in fold-in position and stowed, the back side 106 of the ramp 102 is coplanar with the floor 502 so that the back side 106 may be used as a floor of the vehicle 500.

As will be clear to those of skill in the art, the above embodiments may be altered in various ways without departing from the scope of the present disclosure. Each of the following is a non-limiting example. In any place where a chain is used, it could alternatively be a belt, a gear drive, or any other way of mechanically connecting the two elements. In any place where a ramp pivot is used, it could alternatively be a hinge, a shaft, or any type of connection that allows pivot or rotation. In any place where a pivot axis is used, it could be defined by one or more ramp pivots. In any place where a gear is used, it could be interchangeably used as a sprocket. In any place a restraint is used, it could be interchangeably used as a spring.

One or more aspects of the present disclosure are described herein. A first aspect of the present disclosure may include a ramp assembly. The ramp assembly may comprise a ramp that is movable between a fold-in position and a fold-out position through a neutral position, a ramp pivot pivotally supporting the ramp for movement about a pivot axis between the fold-in and fold-out positions, a drive shaft spaced from the ramp pivot in a direction perpendicular to the pivot axis, a drive element connecting the drive shaft to the ramp pivot such that rotation of the drive shaft causes rotation of the ramp pivot, and a spring generating a biasing force by being rotationally tensioned, the spring biasing the drive shaft such that the ramp is biased toward the neutral position when the ramp is in the fold-out position and biased toward the neutral position when the ramp is in the fold-in position.

A second aspect of the present disclosure may include the first aspect, wherein the spring is arranged substantially parallel to the drive shaft.

A third aspect of the present disclosure may include the second aspect, wherein the drive shaft is hollow, and the spring is disposed in the hollow space of the drive shaft.

A fourth aspect of the present disclosure may include any one of the first through third aspects, wherein the spring is arranged substantially perpendicular to the drive element.

A fifth aspect of the present disclosure may include any one of the first through fourth aspect, wherein the spring comprises a torsion bar.

A sixth aspect of the present disclosure may include any one of the first through fifth aspects, wherein the torsion bar is operatively connected to the drive shaft by a chain such that the torsion bar is always engaged with the drive shaft.

A seventh aspect of the present disclosure may include any one of the first through sixth aspect, further comprising a frame, the torsion bar being fixedly mounted to the frame at one end of the torsion bar.

An eighth aspect of the present disclosure may include any one of the first through seventh aspects, wherein the spring comprises a first spring that biases the ramp toward the neutral position when the ramp is in the fold-out position and a second spring that biases the ramp toward the neutral position when the ramp is in the fold-in position, the first spring is unloaded when the ramp is in the fold-in position, and the second spring is unloaded when the ramp is in the fold-out position.

A ninth aspect of the present disclosure may include any one of the first through eighth aspects, wherein the drive element comprises a chain.

A tenth aspect of the present disclosure may include any one of the first through ninth aspects, wherein the drive element comprises a first drive element and a second drive element, and the spring is disposed between the first drive element and the second drive element.

An eleventh aspect of the present disclosure may include any one of the first through tenth aspects, further comprising a damper operatively coupled to the drive shaft.

A twelfth aspect of the present disclosure may include any one of the first through eleventh aspects, wherein the damper is a linear damper or a rotary damper.

A thirteenth aspect of the present disclosure may include any one of the first through twelfth aspects, wherein the damper is operatively coupled to the drive shaft by a chain.

A fourteenth aspect of the present disclosure may include any one of the first through thirteenth aspects, further comprising a frame that has a first side and a second side opposite the first side, wherein the frame supports the ramp pivot at the first side such that the ramp pivots about the first side.

A fifteenth aspect of the present disclosure may include any one of the first through fourteenth aspects, wherein the frame comprises a third side and a fourth side that are substantially perpendicular to the first side and the second side, wherein the drive shaft and the spring are disposed between the third side and the fourth side.

A sixteenth aspect of the present disclosure may include any one of the first through fifteenth aspects, wherein the frame rotatably supports the drive shaft, and the spring is disposed between the first side and the drive shaft.

A seventeenth aspect of the present disclosure may include any one of the first through sixteenth aspects, wherein the drive shaft is disposed closer to the first side than the second side.

An eighteenth aspect of the present disclosure may include any one of the first through seventeenth aspects, further comprising a motor engaging the drive shaft to move the ramp between the fold-in and fold-out positions.

A nineteenth aspect of the present disclosure may include a ramp assembly. The ramp assembly may comprise a ramp that is pivotally movable between a fold-in position and a fold-out position through a neutral position, a drive shaft spaced from an axis of pivot of the ramp in a direction perpendicular to the axis, a drive element transmitting rotational force from the drive shaft to the ramp such that rotation of the drive shaft causes movement of the ramp between the fold-in and fold-out positions, and a spring generating a biasing force by being rotationally tensioned, the spring biasing the drive shaft such that the ramp is biased toward the neutral position when the ramp is in the fold-out position and biased toward the neutral position when the ramp is in the fold-in position.

A twentieth aspect of the present disclosure may include a vehicle having a ramp assembly. The vehicle may comprise a ramp that is movable between a fold-in position and a fold-out position through a neutral position, a ramp pivot pivotally supporting the ramp for movement about a pivot axis between the fold-in and fold-out positions, a drive shaft spaced from the ramp pivot in a direction perpendicular to the pivot axis, a drive element connecting the drive shaft to the ramp pivot such that rotation of the drive shaft causes rotation of the ramp pivot, and a spring generating a biasing force by being rotationally tensioned, the spring biasing the drive shaft such that the ramp is biased toward the neutral position when the ramp is in the fold-out position and biased toward the neutral position when the ramp is in the fold-in position.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A ramp assembly, comprising:
   a ramp that is movable between a fold-in position and a fold-out position through a neutral position;
   a ramp pivot pivotally supporting the ramp for movement about a pivot axis between the fold-in and fold-out positions;
   a drive shaft spaced from the ramp pivot in a direction perpendicular to the pivot axis;
   a drive element connecting the drive shaft to the ramp pivot such that rotation of the drive shaft causes rotation of the ramp pivot;
   a frame offset from the drive shaft;
   at least one torsion bar being fixedly mounted to the frame at one end of the at least one torsion bar and operably coupled to the drive shaft at an opposite end of the at least one torsion bar, generating a biasing force by being rotationally tensioned, the at least one torsion bar biasing the drive shaft such that the ramp is biased toward the neutral position when the ramp is in the fold-out position and biased toward the neutral position when the ramp is in the fold-in position; and
   a motor offset from the drive shaft and the ramp pivot, the motor operably coupled to the drive shaft, whereby the ramp pivot, the drive shaft, the at least one torsion bar, and the motor are offset from one another to provide a compact width of the ramp assembly.

2. The ramp assembly of claim 1, wherein the at least one torsion bar is arranged substantially parallel to the drive shaft.

3. The ramp assembly of claim 1, wherein the at least one torsion bar is operatively connected to the drive shaft by a link such that the torsion bar is always engaged with the drive shaft.

4. The ramp assembly of claim 1, wherein the motor further comprises a motor shaft positioned parallel to the drive shaft.

5. The ramp assembly of claim 1, wherein the drive element comprises a chain.

6. The ramp assembly of claim 1, wherein the at least one torsion bar is operatively connected to the drive shaft by a chain such that the torsion bar is always engaged with the drive shaft.

7. The ramp assembly of claim 1, further comprising a damper operatively coupled to the drive shaft.

8. The ramp assembly of claim 7, wherein the damper is a linear damper or a rotary damper.

9. The ramp assembly of claim 7, wherein the damper is operatively coupled to the drive shaft by a chain.

10. The ramp assembly of claim 1, further comprising a ramp support frame that has a first side and a second side opposite the first side, wherein the ramp support frame supports the ramp pivot at the first side such that the ramp pivots about the first side.

11. The ramp assembly of claim 10, wherein the ramp support frame comprises a third side and a fourth side that are substantially perpendicular to the first side and the second side, wherein the drive shaft and the spring are disposed between the third side and the fourth side.

12. The ramp assembly of claim 10, wherein the ramp support frame rotatably supports the drive shaft, and the at least one torsion bar is disposed between the first side and the drive shaft.

13. The ramp assembly of claim 12, wherein the drive shaft is disposed closer to the first side than the second side.

14. A ramp assembly, comprising:
a ramp that is pivotally movable between a fold-in position and a fold-out position through a neutral position;
a drive shaft spaced from an axis of pivot of the ramp in a direction perpendicular to the axis;
a drive element transmitting rotational force from the drive shaft to the ramp such that rotation of the drive shaft causes movement of the ramp between the fold-in and fold-out positions;
a frame offset from the drive shaft;
a at least one torsion bar being fixedly mounted to the frame at one end of the at least one torsion bar and operably coupled to the drive shaft at an opposite end of the at least one torsion bar, generating a biasing force by being rotationally tensioned, the at least one torsion bar biasing the drive shaft such that the ramp is biased toward the neutral position when the ramp is in the fold-out position and biased toward the neutral position when the ramp is in the fold-in position; and
a motor offset from the drive shaft and the ramp pivot, the motor operably coupled to the drive shaft,
whereby the ramp pivot, the drive shaft, the at least one torsion bar, and the motor are offset from one another to provide a compact width of the ramp assembly.

15. The ramp assembly of claim 14, wherein the motor further comprises a motor shaft positioned parallel to the drive shaft.

16. A vehicle having a ramp assembly, comprising:
a ramp that is movable between a fold-in position and a fold-out position through a neutral position;
a ramp pivot pivotally supporting the ramp for movement about a pivot axis between the fold-in and fold-out positions;
a drive shaft spaced from the ramp pivot in a direction perpendicular to the pivot axis;
a drive element connecting the drive shaft to the ramp pivot such that rotation of the drive shaft causes rotation of the ramp pivot;
a frame offset from the drive shaft;
a at least one torsion bar being fixedly mounted to the frame at one end of the at least one torsion bar and operably coupled to the drive shaft at an opposite end of the at least one torsion bar, generating a biasing force by being rotationally tensioned, the at least one torsion bar biasing the drive shaft such that the ramp is biased toward the neutral position when the ramp is in the fold-out position and biased toward the neutral position when the ramp is in the fold-in position; and
a motor offset from the drive shaft and the ramp pivot, the motor operably coupled to the drive shaft,
whereby the ramp pivot, the drive shaft, the at least one torsion bar, and the motor are offset from one another to provide a compact width of the ramp assembly.

17. The vehicle having a ramp assembly of claim 16, wherein the motor further comprises a motor shaft positioned parallel to the drive shaft.

18. A ramp assembly, comprising:
a ramp that is movable between a fold-in position and a fold-out position through a neutral position;
a ramp pivot pivotally supporting the ramp for movement about a pivot axis between the fold-in and fold-out positions;
a drive shaft spaced from the ramp pivot in a direction perpendicular to the pivot axis;
a drive element connecting the drive shaft to the ramp pivot such that rotation of the drive shaft causes rotation of the ramp pivot;
a frame offset from the drive shaft;
a torsion bar assembly comprising at least one torsion bar being fixedly mounted to the frame at one end of the at least one torsion bar and operably coupled to a reversing lever at an opposite end of the at least one torsion bar, the reversing lever operably coupled to the drive shaft and rotationally tensioning the at least one torsion bar to generate a biasing force, the at least one torsion bar biasing the drive shaft such that the ramp is biased toward the neutral position when the ramp is in the fold-out position and biased toward the neutral position when the ramp is in the fold-in position; and
a motor offset from the drive shaft and the ramp pivot, the motor operably coupled to the drive shaft,
whereby the ramp pivot, the drive shaft, the torsion bar assembly, and the motor are offset from one another to provide a compact width of the ramp assembly.

19. The ramp assembly of claim 18, wherein the torsion bar assembly further comprises a pull bar, the pull bar operably coupled to a distal end of the reversing lever and a link coupled to the drive shaft.

20. The ramp assembly of claim 18, wherein the motor further comprises a motor shaft positioned parallel to the drive shaft.

* * * * *